United States Patent
Cha

(10) Patent No.: US 11,977,735 B2
(45) Date of Patent: May 7, 2024

(54) MEMORY DEVICE, STORAGE DEVICE INCLUDING THE SAME, AND METHOD OF OPERATING THE STORAGE DEVICE

(71) Applicant: Samsung Electronics Co., Ltd., Suwon-si (KR)

(72) Inventor: Sangsoo Cha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 38 days.

(21) Appl. No.: 17/308,165

(22) Filed: May 5, 2021

(65) Prior Publication Data

US 2021/0357128 A1 Nov. 18, 2021

(30) Foreign Application Priority Data

May 13, 2020 (KR) .................. 10-2020-0057190

(51) Int. Cl.
*G06F 3/06* (2006.01)

(52) U.S. Cl.
CPC .......... *G06F 3/0608* (2013.01); *G06F 3/0655* (2013.01); *G06F 3/0679* (2013.01)

(58) Field of Classification Search
CPC ............ G06F 12/0246; G06F 11/0793; G06F 3/0679; G06F 3/0652; G06F 3/0659; G06F 3/0608; G06F 3/0655; G06F 3/0616; G06F 2212/7203
USPC .................................................. 711/154, 103
See application file for complete search history.

(56) References Cited

U.S. PATENT DOCUMENTS

| | | | |
|---|---|---|---|
| 6,449,625 B1 | 9/2002 | Wang | |
| 7,450,420 B2 | 11/2008 | Sinclair et al. | |
| 7,730,213 B2 | 6/2010 | Howard | |
| 8,954,435 B2 | 2/2015 | Patwardhan et al. | |
| 9,251,019 B2 | 2/2016 | Losh et al. | |
| 9,430,376 B2 | 8/2016 | Horn | |
| 11,397,674 B1* | 7/2022 | Jiang | G06F 3/067 |
| 2007/0150691 A1* | 6/2007 | Illendula | G06F 12/0246 711/170 |
| 2007/0180691 A1* | 8/2007 | Dixon | H01M 10/0404 29/730 |
| 2007/0233752 A1 | 10/2007 | Bangalore et al. | |
| 2009/0248763 A1 | 10/2009 | Rajan et al. | |
| 2010/0174853 A1 | 7/2010 | Lee et al. | |
| 2015/0149693 A1* | 5/2015 | Ng | G11C 11/5628 711/103 |
| 2015/0355845 A1* | 12/2015 | Lee | G06F 3/0659 711/103 |

(Continued)

OTHER PUBLICATIONS

Extended European Search Report dated Oct. 1, 2021 for EP Patent Application No. 21166940.3.

(Continued)

*Primary Examiner* — Hashem Farrokh
(74) *Attorney, Agent, or Firm* — Muir Patent Law, PLLC

(57) ABSTRACT

An operating method of a storage device includes detecting whether a reclaim event has occurred on a source memory area including a plurality of memory areas, setting a reclaim priority value to each of the plurality of memory areas, and performing a reclaim operation on the source memory area according to the reclaim priority value of each of the plurality of memory areas. The reclaim operation moves data stored in the source memory area to a destination memory area.

18 Claims, 16 Drawing Sheets

(56) References Cited

U.S. PATENT DOCUMENTS

2016/0162375 A1* 6/2016 Kim .................. G06F 3/0673
714/6.13
2019/0196958 A1* 6/2019 Lee .................... G11C 16/26
2020/0349067 A1* 11/2020 Syamala ............ G06F 12/0253

OTHER PUBLICATIONS

First Office Action dated Jul. 4, 2023 by the European Patent Office for corresponding patent application EP Patent Application No. 21166940.3.
Letter of Reply from the Applicant accompanying an amended set of claims to EP Patent Application No. 21166940.3, received by the European Patent Office electronically on May 13, 2022.

* cited by examiner

MEMORY DEVICE, STORAGE DEVICE INCLUDING THE SAME, AND METHOD OF OPERATING THE STORAGE DEVICE

CROSS-REFERENCE TO RELATED APPLICATION

This application claims the benefit of Korean Patent Application No. 10-2020-0057190, filed on May 13, 2020, in the Korean Intellectual Property Office, the disclosure of which is herein incorporated by reference.

BACKGROUND

The inventive concept relates to memory devices, and more particularly, to memory devices, storage devices including the memory devices, and operating methods of the storage devices.

A flash memory, which is a non-volatile memory, may retain stored data even when power is cut off. Recently, a storage device including the flash memory such as an embedded multi-media card (eMMC), universal flash storage (UFS), solid state drive (SSD), and a memory card has been widely used for storing or moving a large amount of data. There is a continuing need for methods and devices that may improve the reliability of the storage device.

SUMMARY

The inventive concept provides a memory device capable of improving the reliability of a storage device, a storage device including the memory device, and an operating method of the storage device.

According to an exemplary embodiment of the present invention, an operating method of a storage device includes detecting whether a reclaim event has occurred on a source memory area including a plurality of memory areas, setting a reclaim priority value to each of the plurality of memory areas, and performing a reclaim operation on the source memory area according to the reclaim priority value of each of the plurality of memory areas. The reclaim operation moves data stored in the source memory area to a destination memory area.

According to an exemplary embodiment of the present invention, a storage device includes a nonvolatile memory device, and a controller operatively coupled to the nonvolatile memory device and configured to detect whether a reclaim event has occurred on a source memory area of the nonvolatile memory device, wherein the source memory area including a plurality of memory areas, set a reclaim priority value to each of the plurality of memory areas, and perform a reclaim operation on the source memory area based on the reclaim priority value of each of the plurality of memory areas.

According to an exemplary embodiment of the present invention, a memory device includes a memory cell array comprising a plurality of memory blocks, each of the plurality of memory blocks comprising a plurality of pages, and a control logic circuit configured to generate a control signal for performing a reclaim operation in a unit of a memory block. The control logic circuit is configured to perform the reclaim operation by moving data of each page of a source block to a destination block among the plurality of memory blocks according to a reclaim priority value of each page.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
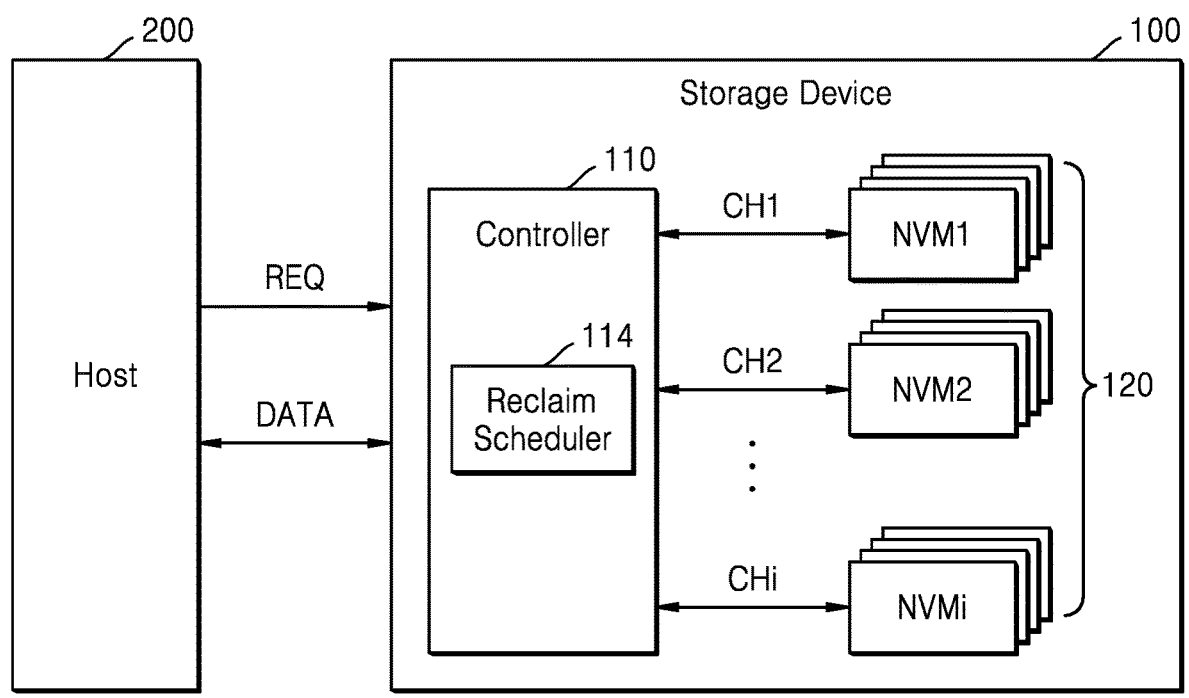
FIG. 1 is a block diagram illustrating a storage system according to an embodiment.

FIG. 1 is a block diagram illustrating a storage system 10 according to an embodiment.

The storage system 10 may be implemented as, for example, a personal computer (PC), a data server, a network-attached storage (NAS), an Internet of Things (IoT) device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multi-media player (PMP), a personal navigation device (PND), an MP3 player, a handheld game console, an e-book, a wearable device, etc.

The storage system 10 may include a storage device 100 and a host 200. The host 200 may control the operation of the storage device 100. In an embodiment, the storage device 100 may include one or more solid state drives (SSDs). When the storage device 100 includes SSDs, the storage device 100 may include a plurality of flash memory devices (e.g., NAND memory devices) that store data.

The storage device 100 may include one or more flash memory devices. In an embodiment, the storage device 100 may be an embedded memory embedded in the storage system 10. For example, the storage device 100 may be an embedded Multi-Media Card (eMMC) or an embedded Universal Flash Storage (UFS) memory device. In an embodiment, the storage device 100 may be an external memory detachable from the storage system 10. For example, the storage device 100 may be a UFS memory card, a Compact Flash (CF) card, a Secure Digital (SD) card, a Micro Secure Digital (Micro-SD) card, a Mini Secure Digital (Mini-SD) card, extreme Digital (xD), or a memory stick.

Referring to FIG. 1, the storage system 10 may include the storage device 100 and the host 200, and the storage device 100 may include a controller 110 and a nonvolatile memory 120. The host 200 may communicate with the storage device 100 through various interfaces, and may transfer a request REQ, such as a read request and a program request, to the storage device 100. In an embodiment, the host 200 may be implemented as an application processor (AP) or a system-on-a-chip (SoC).

The controller 110 may control the operation of the nonvolatile memory 120 through channels CH1~CHn. The controller 110 may control the nonvolatile memory 120 to read data DATA stored in the nonvolatile memory 120 in response to a read request of the host 200, or to program the data DATA to the nonvolatile memory 120 in response to a write request of the host 200.

When a reclaim event has occurred, the controller 110 may perform a reclaim operation by controlling the nonvolatile memory 120. At this time, the "reclaim operation" refers to an operation of moving data in a source memory area to a destination memory area and reusing the source memory area by erasing the data of the source memory area. Specifically, in the reclaim operation, the controller 110 may read valid data stored in the source memory area, and program the read valid data to the destination memory area. Accordingly, an address corresponding to the valid data in a mapping table may be changed from the source memory area to the destination memory area. In an example embodiment, the source memory area may correspond to a memory block having at least one page on which a reclaim event has occurred, and the destination memory area may correspond a free block to store valid data moved from the source memory. The present invention is not limited thereto. In an example embodiment, the source memory area may correspond to part of a memory block, and the destination memory area may correspond to part of a free block. The memory block may be a unit of an erase operation.

In an embodiment, the controller 110 may include a reclaim scheduler 114. The reclaim scheduler 114 may set a reclaim priority value of a memory area that is a target of the reclaim operation, and may set an order of memory areas in which the reclaim operation is performed according to the set priority value. The reclaim scheduler 114 may schedule the reclaim operation to be performed by priority as the priority value corresponding to the memory area registered in a reclaim queue (e.g., RQ of FIG. 2) increases. In an embodiment, the reclaim scheduler 114 may set reclaim priority values of reclaim operations of a plurality of pages (e.g., PG1 to PGm of FIG. 4) included in a source memory block (e.g., one of BLK1 to BLKn in FIG. 4) that is the target of the reclaim operation.

In an embodiment, the reclaim scheduler 114 may set the priority of a first value (i.e., a first reclaim priority value) with respect to a memory area where the reclaim event has occurred, set the priority of a second value (i.e., a second reclaim priority value) with respect to a memory area where the reclaim event is expected to occur, and set the priority of a third value (i.e., a third reclaim priority value) with respect to other memory areas. The memory area where the reclaim event is expected to occur may be a previously designated memory area having low data reliability due to a physical structure of the memory area. The previously designate memory area will be described with reference to FIGS. 9B and 10A. In a reclaim operation, the first value may be more prioritized than the second value, and the second value may be more prioritized than the third value, but the inventive concept is not limited thereto, and the second value may be more prioritized than the first value, and the first value may be more prioritized than the third value. As the priority value increases, the reclaim operation may be performed earlier on a memory area with a higher value. In an example embodiment, a memory area having the first value may be more prioritized than a memory area having the second and third values in a reclaim operation. In the reclaim operation, data of the memory area having the first value may be firstly moved to a destination area, and data of the memory areas having the second and third values may be later moved to the destination area. Among the memory areas having the second and third values, data of the memory area having the second value is moved to the destination area, and then data of the memory area having the third value is moved to the destination area.

In an embodiment, the nonvolatile memory 120 may include a plurality of memory devices NVM1 to NVMi that store data. Each of the plurality of memory devices NVM1 to NV Mi may be a semiconductor chip or a semiconductor die Each of the plurality of memory devices NVM1 to NVMi may be connected to a corresponding channel. For example, the nonvolatile memory 120 may include the memory devices NVM1 connected to the controller 110 through the first channel CH1, the memory devices NVM2 connected to the controller 110 through the second channel CH2, and the memory devices NVMi connected to the controller 110 through an i-th channel CHi. At this time, i may be an integer of 3 or more. Among the plurality of memory devices NVM1 to NVMi, a group of memory devices connected to the same channel may perform program, read, and erase operations in an interleaving manner.

Figure 4:
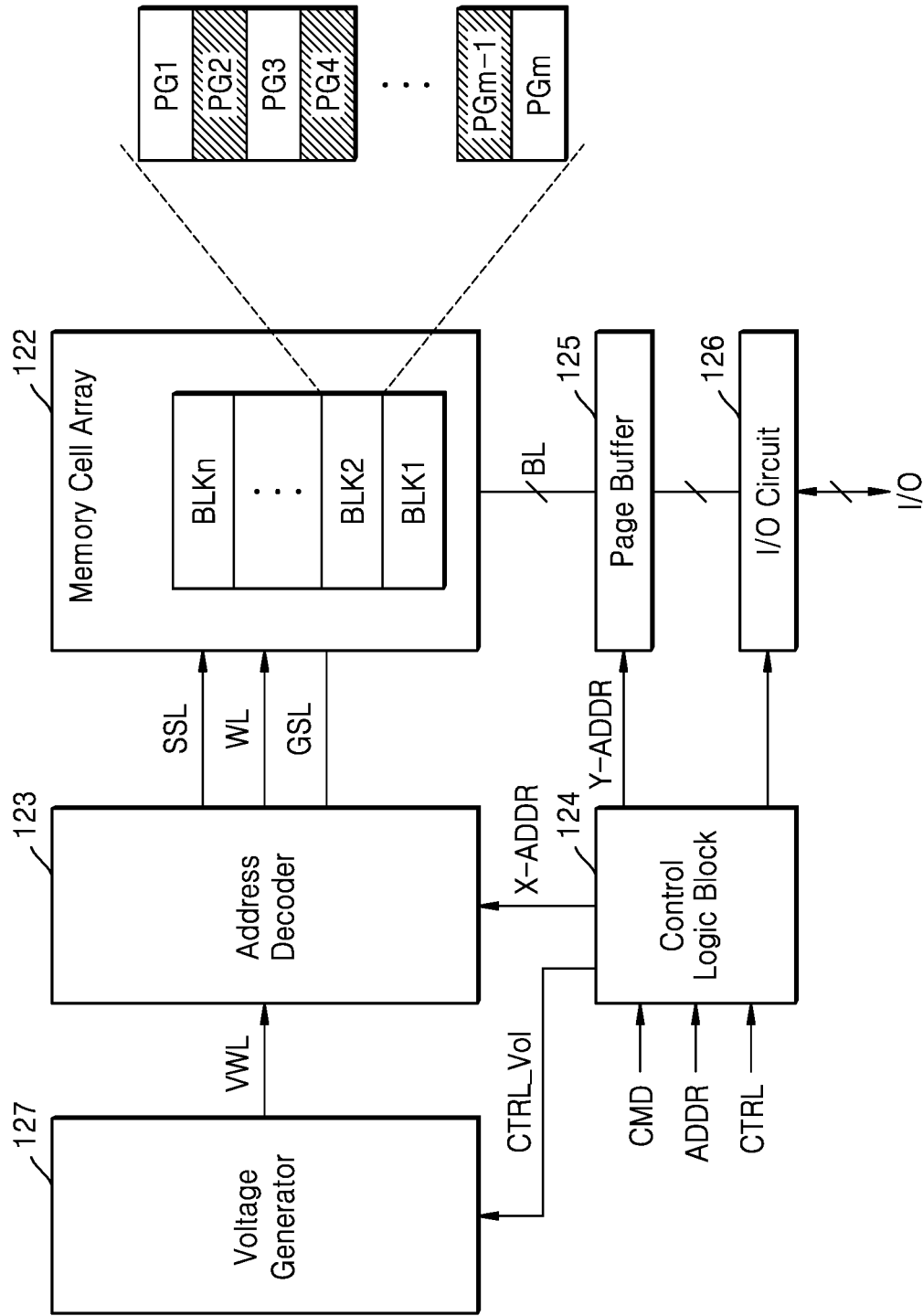
FIG. 4 is a block diagram illustrating a memory device included in a nonvolatile memory of FIG. 1.

Each of the plurality of memory devices NVM1 to NVMi may include a memory cell array (e.g., 122 of FIG. 4). In an embodiment, the memory cell array 122 may include flash memory cells. For example, the flash memory cells may be NAND flash memory cells. However, the inventive concept is not limited thereto, and the memory cells may be resistive memory cells, such as resistive RAM (ReRAM) cells, phase-change RAM (PRAM) cells, or magnetic RAM (MRAM) cells.

The storage device 100 according to the inventive concept may set a reclaim priority of memory areas that are the target of the reclaim operation in advance, and perform the reclaim operation according to the reclaim priority. The storage device 100 may preferentially perform the reclaim operation on the source memory area where the reclaim event has occurred, thereby preventing the reclaim operation on the source memory area from being excessively delayed, even when the request REQ is received from the host 200.

Figure 2:
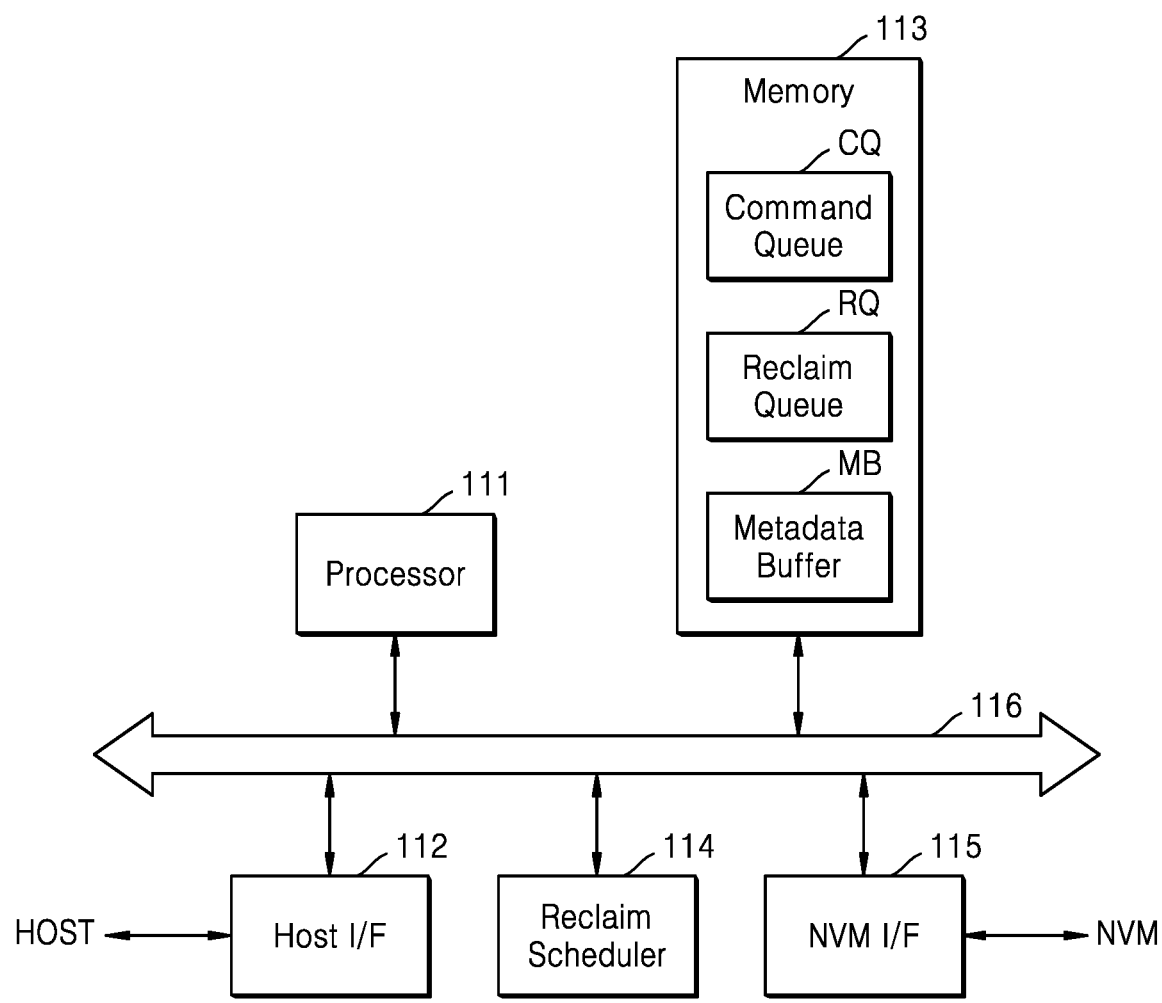
FIG. 2 is a block diagram illustrating a controller included in a storage device of FIG. 1.

FIG. 2 is a block diagram illustrating in detail the controller 110 included in the storage device 100 of FIG. 1.

Referring to FIGS. 1 and 2, the controller 110 may include a processor 111, a host interface 112, a memory 113, the reclaim scheduler 114, and a nonvolatile memory interface 115, which may communicate with each other via a bus 116. The processor 111 may include a central processing unit or a microprocessor, and control all operations of the controller 110. The processor 111 may include one or more processor cores capable of executing an instruction set of program code configured to perform a specific operation. For example, the processor 111 may execute command code of firmware stored in the memory 113.

The reclaim scheduler 114 may set the priority of the reclaim operation of the memory areas that are the target of the reclaim operation, and schedule the reclaim operation to be performed according to a reclaim priority. The reclaim scheduler 114 may be implemented with hardware, software or firmware. When the reclaim scheduler 114 is implemented with software or firmware, the reclaim scheduler 114 may be loaded into the memory 113 and operate under the control of the processor 111. The memory 113 may be used as an operation memory, a buffer memory, a cache memory, etc., and, for example, implemented as a dynamic random access memory (DRAM), a static random access memory (SRAM), a phase change memory (PRAM) or a flash memory.

A command queue CQ may be implemented as part of the memory 113. Commands according to the request REQ received from the host 200 may be enqueued in the command queue CQ. For example, when a write request is received, a write command corresponding to the write request may be enqueued in the command queue CQ, and when a read request is received, a read command corresponding to the read request may be enqueued in the command queue CQ.

A reclaim queue RQ may be implemented as part of the memory 113. In the reclaim queue RQ, information about a memory area where a reclaim event has occurred may be stored, and information about a reclaim priority of the memory area that is a target of the reclaim operation may be stored. That is, in the reclaim queue RQ, an address of the source memory area may be registered, and a value of the reclaim priority corresponding thereto may be stored. For example, the reclaim queue RQ may store priority values indicating the reclaim priority of each of pages in a memory block. Alternatively, for example, the reclaim queue RQ may store priority values indicating the reclaim priority of each of memory blocks.

A metadata buffer MB may be implemented as part of the memory 113 or a separate DRAM chip. Metadata stored in the metadata buffer MB may be stored in a meta area of the nonvolatile memory 120, and when power is applied to the storage device 100, may be loaded into the metadata buffer MB in the nonvolatile memory 120.

Degradation information with respect to the memory area of the nonvolatile memory 120 may be stored in the metadata buffer MB as the metadata. In an embodiment, the degradation information may be stored for each memory block or for each page. For example, the degradation information indicating a memory area where the reclaim event is expected to occur may be stored in the metadata buffer MB. For example, the degradation information such as indicating a memory area with low data reliability due to a physical structure of the memory area, or indicating a memory area with an erasure count of an erase operation being greater than a reference value may be stored in the metadata buffer MB. The erasure count refers to a number of how many times an erase operation is performed on the memory area. For example, the degradation information may include row addresses of the memory area with the low data reliability or row addresses of the memory array with the erasure count being greater than the reference value. The reclaim scheduler 114 may set the reclaim priority of the memory area that is the target of the reclaim operation based on the degradation information stored in the metadata buffer MB.

The host interface 112 may provide an interface between the host 200 and the controller 110. For example, the host interface 112 may provide the interface that is based on a universal serial bus (USB), a multimedia card (MMC), peripheral component interconnect-express (PCI-E), advanced technology attachment (ATA), serial ATA (SATA), parallel-ATA (PATA), a small computer system interface (SCSI), a serial attached SCSI (SAS), an enhanced small device interface (ESDI), and an intelligent drive electronics (IDE) The nonvolatile memory interface 115 may provide an interface between the controller 110 and the nonvolatile memory 120. For example, the degradation information, the mapping table, the write data, and the read data may be transmitted and received between the controller 110 and the nonvolatile memory 120 through the nonvolatile memory interface 115.

Figure 3:
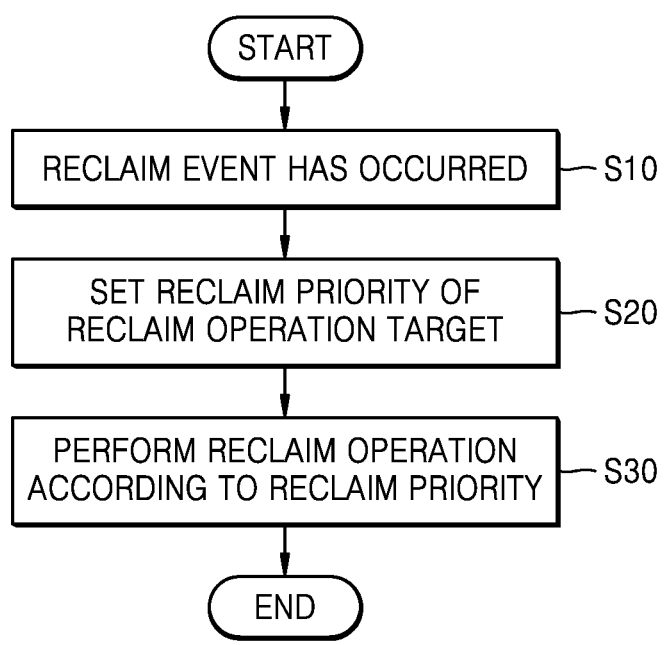
FIG. 3 is a flowchart illustrating an operating method of a storage device according to an embodiment.

FIG. 3 is a flowchart illustrating an operating method of the storage device 100 according to an embodiment. The operation method of operations S10 to S30 illustrated in FIG. 3 may be performed by the storage device 100 of FIG. 1 time-serially.

Referring to FIGS. 1 and 3, in operation S10, the storage device 100 may detect the occurrence of a reclaim event. In an embodiment, the storage device 100 may read data in a specific memory area and may determine that a reclaim event has occurred when an error bit rate (EBR) of the data is greater than or equal to a reference value. Alternatively, in an embodiment, the storage device 100 may execute a recovery code by firmware when a read operation on the specific memory area fails, and determine, in response to when a specific defense code of the recovery code, which are implemented in the firmware, that the reclaim event has occurred in the specific memory area. An algorithm called "defense code" may be implemented in the controller 110 of FIG. 1 to correct or recover read errors. The defense code as the recovery code that copes with the read errors that have already occurred may be implemented in firmware. In an example embodiment, the recovery code may allow a read operation (i.e., a read retry operation) to be repeated using a varying read reference voltage until error correction is completed.

For example, when receiving a read request from the host 200, the storage device 100 may read the data DATA from a specific memory area of the nonvolatile memory 120 through a host read operation, and determine whether to perform the reclaim operation based on the read data DATA. A detailed example of a method of determining whether to perform the reclaim operation through the host read operation will be described in operation S10 of FIG. 12 later.

Alternatively, for example, the storage device 100 may read data from the specific memory area of the nonvolatile memory 120 through a background read operation, and determine whether to perform the reclaim operation based on the read data. The "background read operation" refers to an operation of reading data from the nonvolatile memory 120 by issuing a read command by the controller 110 itself without receiving a read request from the host 200. A detailed example of a method of determining whether to perform the reclaim operation through the background read operation will be described in operations S10a to S10d of FIGS. 13 to 16 later.

In operation S20, the storage device 100 may set a reclaim priority of a reclaim operation target. For example, in operation S10, a reclaim priority value may be set to the memory area where the reclaim event has occurred such that the reclaim operation may be performed first, and a reclaim priority value of a posterior order may be set to a memory area where no reclaim event has occurred but which is the reclaim operation target.

In operation S30, the storage device 100 may perform the reclaim operation according to the set reclaim priority. For example, in operation S10, the storage device 100 may perform the reclaim operation on the memory area where the reclaim event has occurred first, and then subsequently may perform the reclaim operation on the memory area where no reclaim event has occurred but which is the reclaim operation target.

The storage device 100 according to the inventive concept may set a priority value of the reclaim operation on the memory area in advance, and perform the reclaim operation according to the set priority value. Accordingly, even when the request REQ is received from the host 200, the storage device 100 may prevent the reclaim operation on the memory area where the reclaim event has occurred from being excessively delayed. Data reliability of the nonvolatile memory 120 and the storage device 100 may be improved.

FIG. 4 is a block diagram illustrating a memory device 120A included in the nonvolatile memory 120 of FIG. 1.

Referring to FIGS. 1 and 4, the memory device 120A may include a memory cell array 122, an address decoder 123, a control logic block 124, a page buffer 125, an input/output circuit 126, and a voltage generator 127. Although not shown, the memory device 120A may further include an input/output interface.

The memory cell array 122 may be connected to word lines WL, string selection lines SSL, ground selection lines GSL, and bit lines BL. The memory cell array 122 may be connected to the address decoder 123 through the word lines WL, the string selection lines SSL and the ground selection lines GSL, and may be connected to the page buffer 125 through the bit lines BL. The memory cell array 122 may include a plurality of memory blocks BLK1 to BLKn.

Each of the memory blocks BLK1 to BLKn may include a plurality of memory cells and a plurality of selection transistors. The memory cells may be connected to the word lines WL, and the selection transistors may be connected to the string selection lines SSL or the ground selection lines GSL. The memory cells of each of the memory blocks BLK1 to BLKn may include single-level cells storing 1-bit data or multi-level cells storing 2-bit or more data.

Each of the plurality of memory blocks BLK1 to BLKn may include a plurality of pages PG1 to PGm. Each of the pages PG1 to PGm may correspond to a program or read unit of data in one memory block. In an embodiment, memory cells included in each of the pages PG1 to PGm may be connected to the same word line.

The address decoder 123 may select one of the plurality of memory blocks BLK1 to BLKn of the memory cell array 122, may select one of the word lines WL of the selected memory block, and may select one of the plurality of string selection lines SSL.

The control logic block 124 (or a control logic circuit) may output various control signals for performing the program, read, and erase operations on the memory cell array 122 based on a command ICMD, an address ADDR, and a control signal CTRL. The control logic block 124 may provide a row address X-ADDR to the address decoder 123, provide a column address Y-ADDR to the page buffer 125, and provide a voltage control signal CTRL_Vol to the voltage generator 127.

The control logic block 124 may perform an erase operation in units of each of the plurality of memory blocks BLK1 to BLKn. The control logic block 124 may perform a read operation or a program operation in units of each of the plurality of pages PG1 to PGm.

In an embodiment, the control logic block 124 may perform a reclaim operation in units of each of the plurality of memory blocks BLK1 to BLKn. For example, the control logic block 124 may perform the reclaim operation by reading data in units of pages included in the second memory block BLK2, which is a source memory block where a reclaim event has occurred among the plurality of memory blocks BLK1 to BLKn, programming data in units of pages to a destination memory block among the plurality of memory blocks BLK1 to BLKn, and erasing the second memory block BLK2.

In an embodiment, the control logic block 124 may preferentially perform the reclaim operation on the second page PG2, the fourth page PG4, and an (m−1)th page PG(m−1)th where the reclaim event has occurred when performing the reclaim operation on the second memory block BLK2. Therefore, the control logic block 124 may not perform the reclaim operation on the second memory block BLK2 in the order of the row address X-ADDR. For example, when performing the reclaim operation on the second memory block BLK2, the control logic block 124 may preferentially perform the reclaim operation on the second page PG2, the fourth page PG4, and an (m−1)th page PG(m−1)th, and then perform the reclaim operation on the remaining pages in the order of bottom to top from the first page PG1 to an mth page PGm of the second memory block BLK2 or in the order of top to bottom from the mth page PGm to the first page PG1.

The page buffer 125 may operate as a write driver or a sense amplifier depending on an operation mode. During the read operation, the page buffer 125 may sense the bit line BL of the selected memory cell under the control of the control logic block 124. The sensed data may be stored in latches provided inside the page buffer 125. The page buffer 125 may dump the data stored in the latches to the input/output circuit 126 under the control of the control logic block 124.

The input/output circuit 126 may temporarily store the command ICMD, the addresses ADDR, the control signal CTRL, and data DATA that are provided through an input/output line I/O from the outside of the memory device 120A. The input/output circuit 126 may temporarily store read data of the memory device 120A and output the read data to the outside through the input/output line I/O at a designated time.

The voltage generator 127 may generate various types of voltages for performing program, read, and erase operations on the memory cell array 122 based on the voltage control signal CTRL_Vol. Specifically, the voltage generator 127 may generate a word line voltage VWL, a program voltage, a read voltage, a pass voltage, an erase verification voltage, or a program verification voltage, for example. Also, the voltage generator 127 may generate a string selection line voltage and a ground selection line voltage based on the voltage control signal CTRL_Vol. Also, the voltage generator 127 may generate an erase voltage to be provided to the memory cell array 122.

Figure 5:
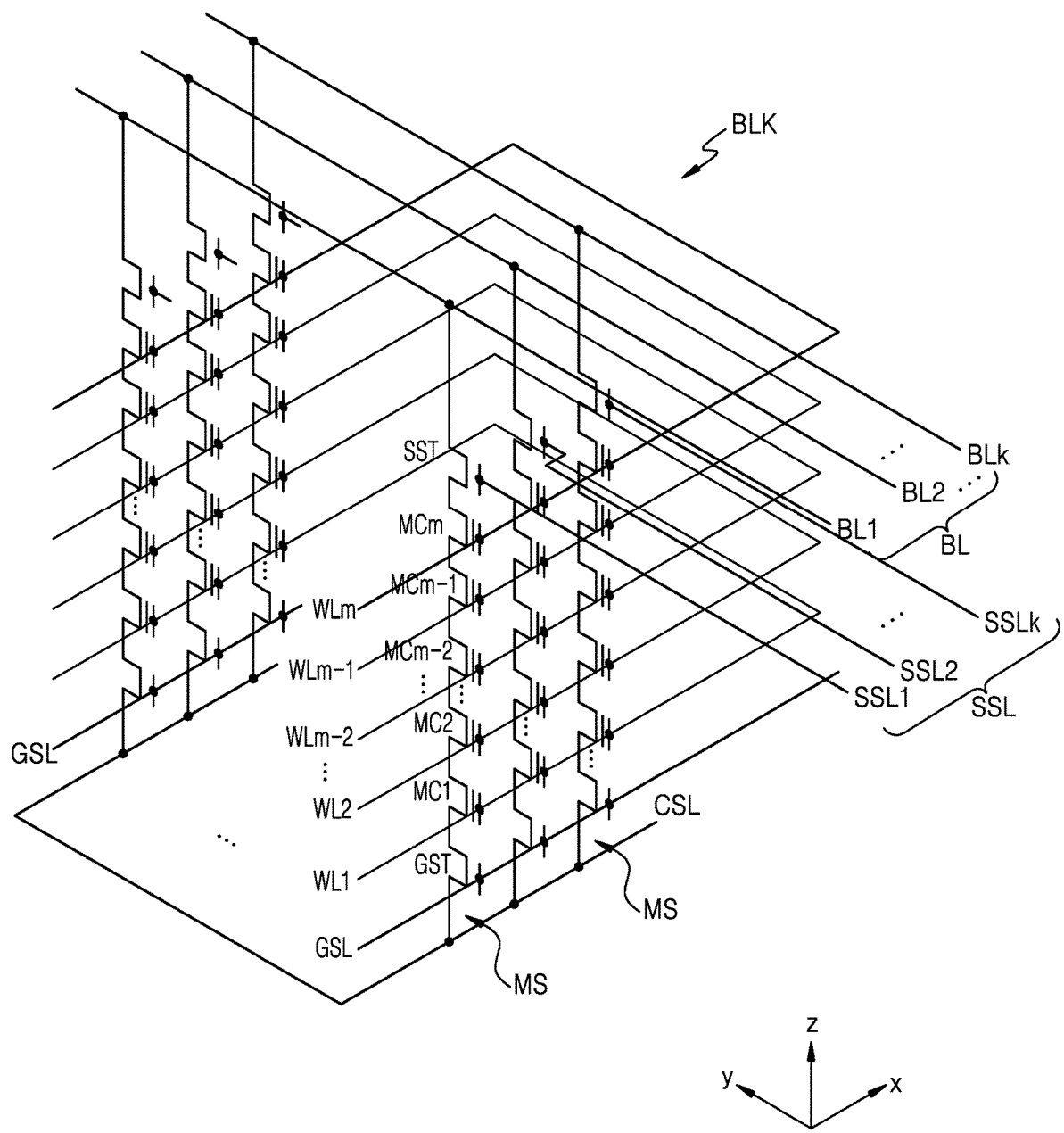
FIG. 5 is an equivalent circuit diagram of a memory block included in a memory cell array of a memory device according to an embodiment.

FIG. 5 is an equivalent circuit diagram of a memory block BLK included in the memory cell array 121 of the memory device 120A according to an embodiment. In FIG. 5, the equivalent circuit diagram of a NAND flash memory device having a vertical channel structure formed on a substrate is illustrated.

Referring to FIG. 5, the memory block BLK included in the memory cell array 121 may include a plurality of memory cell strings MS. The memory block BLK may include a plurality of bit lines BL (for example, BL1 to BLk), a plurality of word lines WL (for example, WL1 to WLn), a plurality of string selection lines SSL (for example, SSL1 to SSLk), and at least one ground selection line GSL, and a common source line CSL. A plurality of memory cell strings MS may be formed between the plurality of bit lines BL1 to BLk and the common source line CSL.

Each of the plurality of memory cell strings MS may include a string selection transistor SST, a ground selection transistor GST, and a plurality of memory cells MC1 to MCm. A drain area of the string selection transistor SST may be connected to the bit lines BL, and a source area of the ground selection transistor GST may be connected to the common source line CSL. The common source line CSL may be a area in which the source areas of the plurality of ground selection transistors GST are commonly connected.

In order to independently control the plurality of memory cell strings MS, the string selection transistors SST included in each of the plurality of memory cell strings MS may be connected to the different string selection lines SSL. For example, the string selection transistor SST may be connected to the string selection line (e.g., one of SSL1, SSL2, and SSL3).

The ground selection transistor GST may be connected to the ground selection line GSL. In an embodiment, the different ground selection transistors GST included in the plurality of memory cell strings MS of the memory block BLK may be connected to the same ground selection line GSL, but are not limited thereto and may be connected to different ground selection lines GSL.

The plurality of memory cells MC1 to MCm constituting the memory cell string MS in the memory block BLK may have a structure connected in series in the Z-axis direction perpendicular to a main surface of a substrate. In the memory block BLK, the plurality of word lines WL may extend in the X-axis direction, and the plurality of bit lines BL may extend in the Y-axis direction.

The memory cells MC1 to MCm of the memory cell string MS may be connected to the plurality of word lines WL, respectively. Each of the plurality of memory cells MC1 to MCm may store one bit of data or two or more bits of data. In an embodiment, some of the plurality of memory cells MC1 to MCm may be single-level cells, and the others of the plurality of memory cells MC1 to MCm may be multi-level cells. For example, the first memory cells MC1 among the plurality of memory cells MC1 to MCm formed on the lowermost layer and connected to the first word line WL1 may be single-level cells. Also, for example, the mth memory cells MCm among the plurality of memory cells MC1 to MCm formed on the uppermost layer among the plurality of memory cells MC1 to MCm and connected to the mth word line WLm may be single-level cells. Memory cells among the plurality of memory cells MC1 to MCm formed on the uppermost layer and the lowermost layer, for example, the first memory cells MC1 and the mth memory cells MCm may be formed as single-level cells, and thus the data reliability may be improved.

In the plurality of memory cell strings MS, program and read operations may be performed in units of pages. The page may be one row of memory cells connected to one word line. In an example embodiment, each of the plurality of memory cells MC1 to MCm may be selected in units of pages by a corresponding one of the plurality of word lines WL.

Figure 6A:
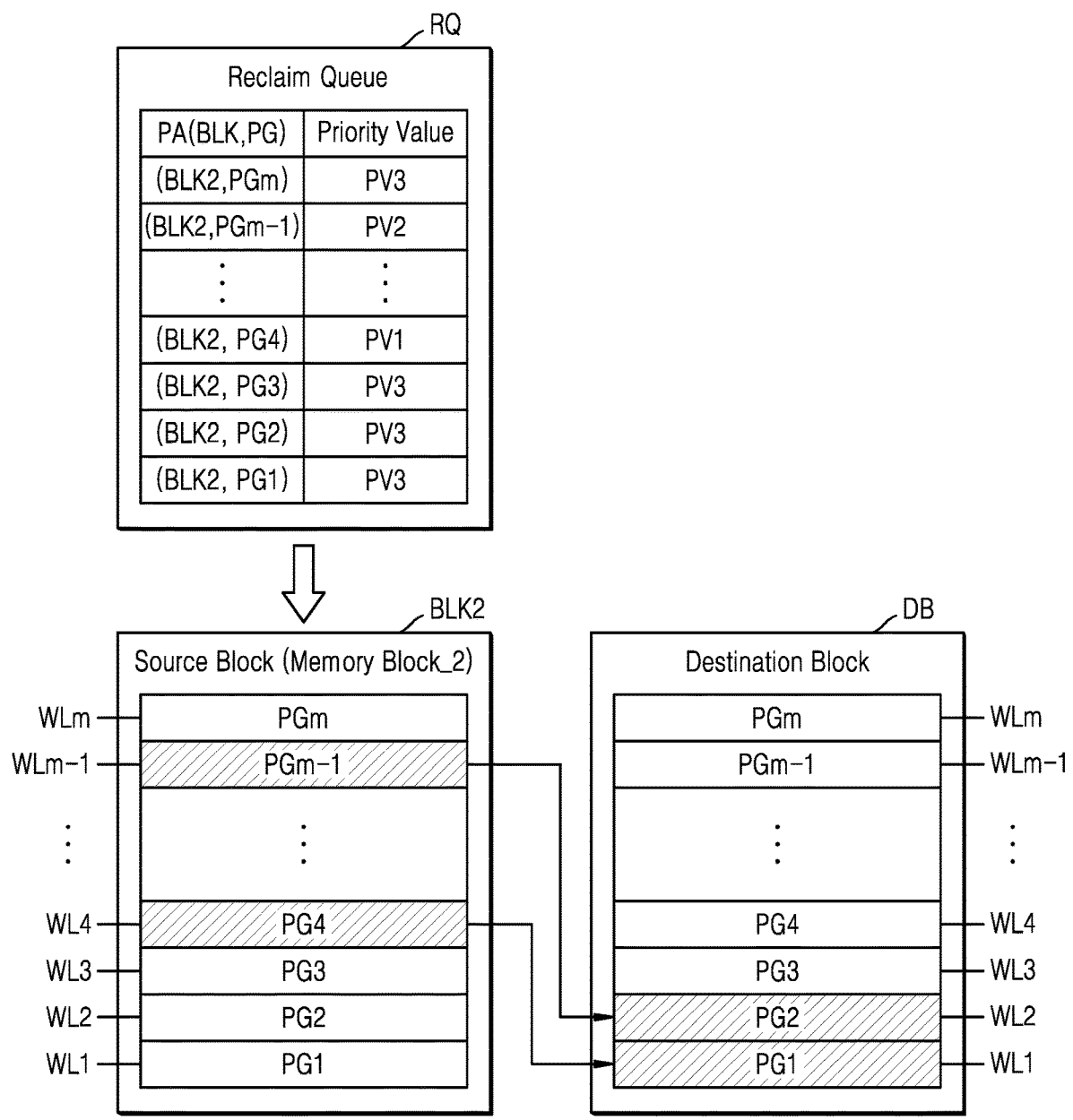
FIGS. 6A and 6B are diagrams illustrating a reclaim operation of a storage device according to an embodiment.
Figure 6B:
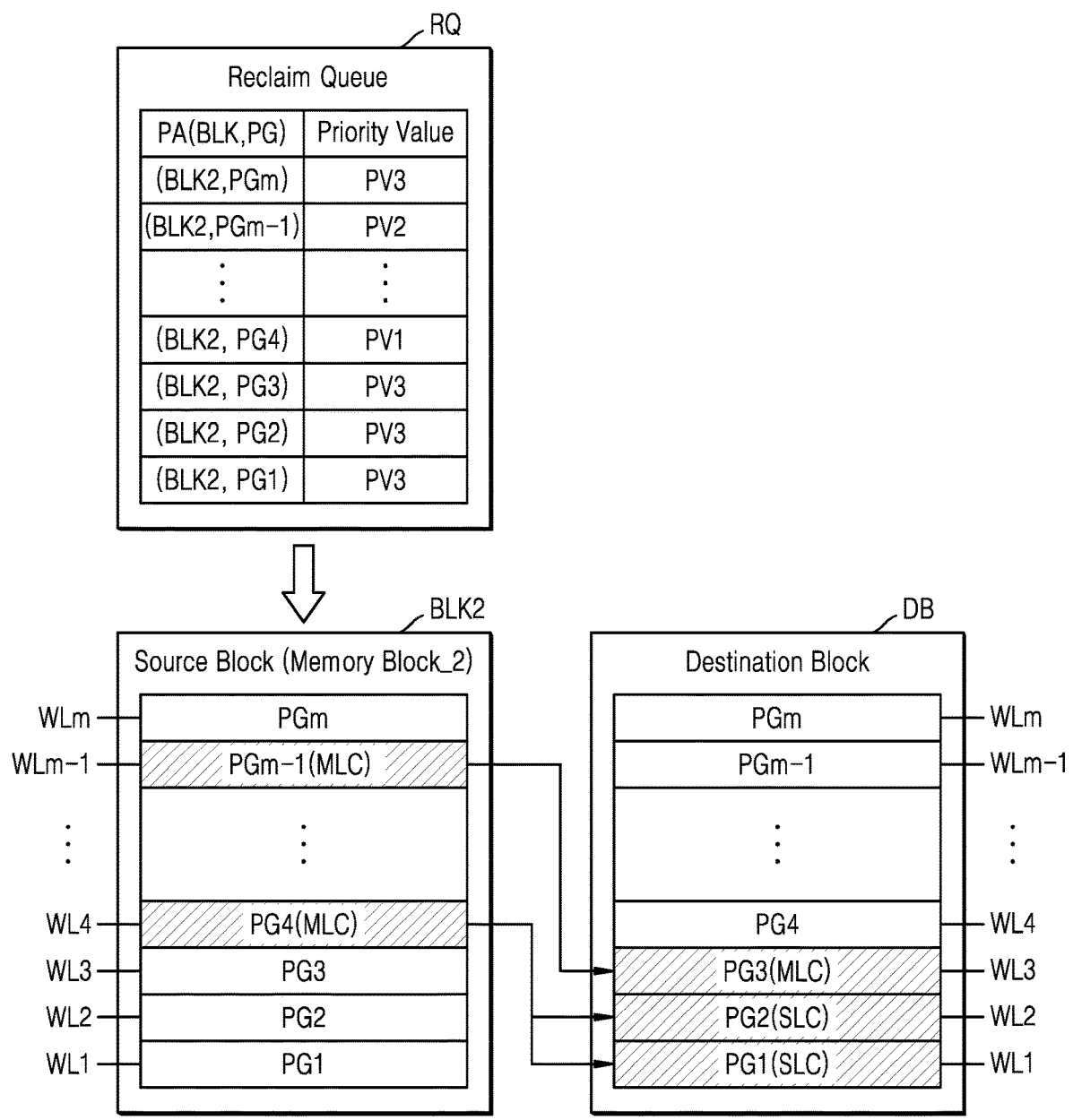

FIGS. 6A and 6B are diagrams illustrating a reclaim operation of the storage device 100 according to an embodiment.

Referring to FIGS. 2 and 6A, the second memory block BLK2 in which a reclaim event has occurred according to operation S10 of FIG. 3 may be registered in the reclaim queue RQ as a source block. Information about the second memory block BLK2 may be stored in the reclaim queue RQ. In an embodiment, a reclaim priority value may be stored in the reclaim queue RQ for each physical address of the plurality of pages PG1 to PGm included in the second memory block BLK2. For example, in the reclaim queue RQ, a reclaim priority of a first value PV1 corresponding to the fourth page PG4 may be set, and a reclaim priority of a second value PV2 corresponding to the (m−1)th page PG(m−1)th may be set, and a reclaim priority of a third value PV3 corresponding to the other pages may be set.

In an embodiment, the fourth page PG4 may be a target memory area where the reclaim event has occurred. In an embodiment, the (m−1)th page PG(m−1)th may be a memory area where the reclaim event is expected to occur.

The controller 110 may determine the order of reclaim operations of the plurality of pages PG1 to PGm included in the second memory block BLK2 based on the reclaim priority value stored in the reclaim queue RQ. For example, the first value PV1 may be greater than the second value PV2 and the second value PV2 may be greater than the third value PV3. The controller 110 may preferentially perform the reclaim operation on a memory area having a relatively large reclaim priority value. In FIG. 6A, the three different reclaim priority values PV1, PV2, and PV3 are described as an example, but this is for convenience of description, and the reclaim priority value may be variously set.

The controller 110 may read data from the fourth page PG4 of the second memory block BLK2 connected to the fourth word line WL4, and then move the read data to the first page PG1 of a destination block DB. Thereafter, the controller 110 may read data from the (m−1)th page PG(m−1)th of the second memory block BLK2 connected to the (m−1)th word line WL(m−1), and then move the read data to the second page PG2 of the destination block DB. The destination block DB may be one of free blocks excluding the second memory block BLK2 from the plurality of memory blocks BLK1 to BLKn.

The controller 110 may perform the reclaim operation on pages having the same reclaim priority value in the order of row address. For example, the reclaim operation may be sequentially performed in the order of the first page PG1 of the second memory block BLK2 connected to the first word line WL1, the second page PG2 of the second memory block BLK2 connected to the second word line WL2, the third page PG3 of the second memory block BLK2 connected to the third word line WL3, and the mth page PGm of the second memory block BLK2 connected to the mth word line WLm, and the data may be sequentially programmed in the third to mth pages PG3 to PGm of the destination block DB. However, the storage device 100 according to the inventive concept is not limited to programming the data in the destination block DB in the order of the row address of bottom to top. The storage device 100 may program the data in the destination block DB in the order of the row address of top to bottom.

Referring to FIGS. 2 and 6B, the controller 110 may move data programmed in a multi-level cell where 2-bit or more data of the second memory block BLK2, which is a source block, is stored to a single-level cell where 1-bit data of the destination block DB is stored.

For example, the fourth page PG4 and the (m−1)th page PG(m−1)th of the second memory block BLK2 may include multi-level cells in which 2-bit data is stored, while the first page PG1 and the second page PG2 of the destination block DB may include single-level cells in which 1-bit data is stored, and the third page PG3 of the destination block DB may include a multi-level cell in which 2-bit data is stored. The controller 110 may read the fourth page PG4 of the second memory block BLK2 connected to the fourth word line WL4, and then move the data to the first page PG1 and the second page PG2 of the destination block DB. Thereafter, the controller 110 may read the (m−1)th page PG(m−1)th of the second memory block BLK2 connected to the (m−1)th word line WL(m−1), and then move the data to the third page PG3 of the destination block DB. The above description may also be applied when data is moved from a triple level cell in which 3-bit data is stored to a single level cell, or when data is moved from the triple level cell to a multi-level cell in which 2-bit data is stored. To the contrary, the above description may be applied even when data is moved from a single-level cell to the multi-level cell in which 2-bit or more data is stored.

Figure 7:
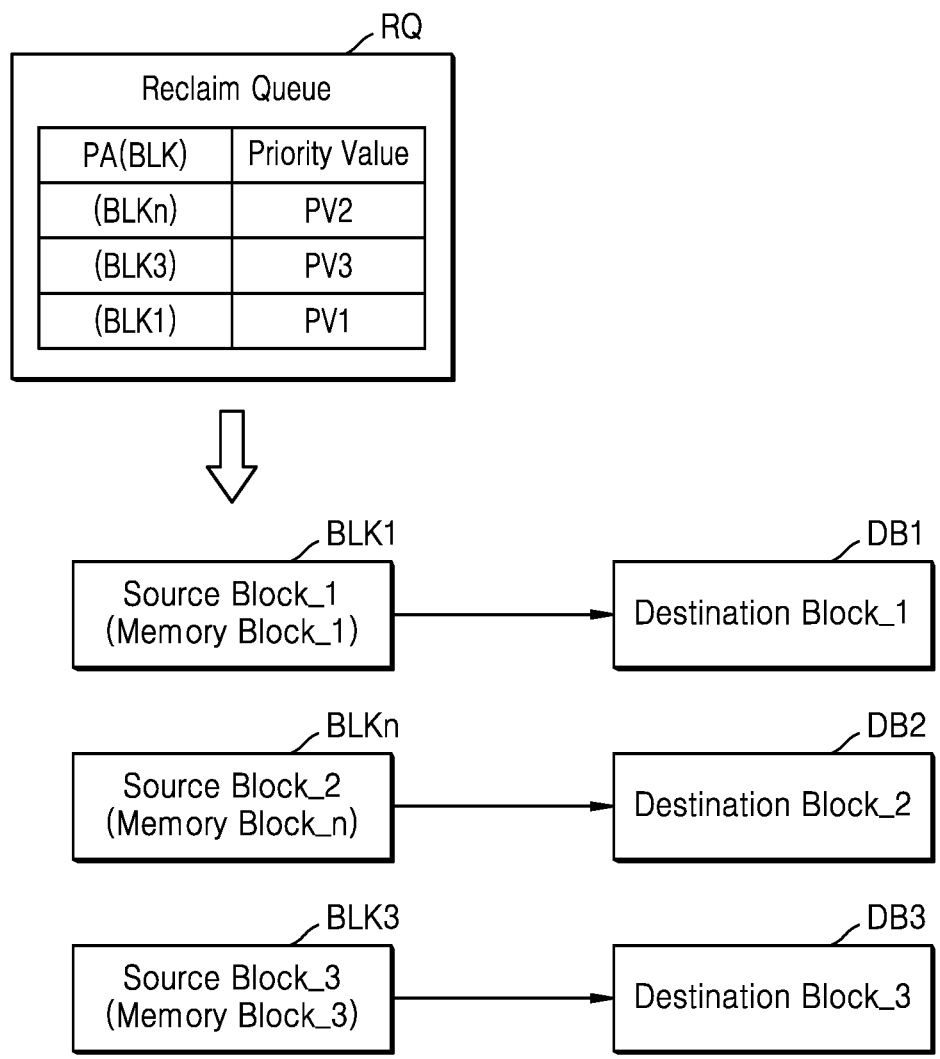
FIG. 7 is a diagram illustrating a reclaim operation of a storage device according to an embodiment.

FIG. 7 is a diagram illustrating a reclaim operation of the storage device 100 according to an embodiment.

Referring to FIGS. 1 and 7, the first memory block BLK1, the third memory block BLK3 and the nth memory block in which a reclaim event has occurred according to operation S10 of FIG. 3 may be respectively registered as first to third source blocks in the reclaim queue RQ. Physical addresses of the source blocks and reclaim priority values corresponding thereto may be stored in the reclaim queue RQ. For example, in the reclaim queue RQ, the reclaim priority value of the first value PV1 corresponding to the first memory block BLK1 may be set, the reclaim priority value of the second value PV2 corresponding to the nth memory block BLKn may be set, and the reclaim priority value of the third value PV3 corresponding to the third memory block BLK3 may be set.

The controller 110 may determine a priority of the reclaim operation between the memory blocks registered in the reclaim queue RQ based on the reclaim priority values stored in the reclaim queue RQ. For example, the first value PV1 may be greater than the second value PV2 and the second value PV2 may be greater than the third value PV3. The controller 110 may preferentially perform the reclaim operation on a memory area having a relatively large reclaim priority value.

The controller 110 may read data from the first memory block BLK1 as the first source block, move the data to the first destination block DB1, and then erase the first memory block BLK1. Next, the controller 110 may read data from the n-th memory block BLKn as the second source block, move the data to the second destination block DB2, and then erase the n-th memory block BLKn. Then, the controller 110 may read data from the third memory block BLK3 as the third source block, move the data to the third destination block DB3, and then erase the third memory block BLK3. The first to third destination blocks DB1 to DB3 may be included in free blocks excluding the first memory block BLK1, the third memory block BLK3, and the nth memory block BLKn from the plurality of memory blocks BLK1 to BLKn.

The description provided with reference to FIGS. 6A and 6B may be applied to a reclaim operation order between the plurality of pages PG1 to PGm included in each of the first memory block BLK1, the third memory block BLK3, and the nth memory block BLKn when the controller 110 performs the reclaim operation on each of the first memory block BLK1, the third memory block BLK3, and the nth memory block BLKn. That is, among the plurality of pages PG1 to PGm included in each of the first memory block BLK1, the third memory block BLK3, and the nth memory block BLKn, the reclaim operation may be preferentially performed on a page in which a reclaim event has occurred. Alternatively, the reclaim operation on the plurality of pages PG1 to PGm included in each of the first memory block BLK1, the third memory block BLK3, and the nth memory block BLKn may be performed in the order of row address of bottom to top or in the order of row address of top to bottom.

Figure 8:
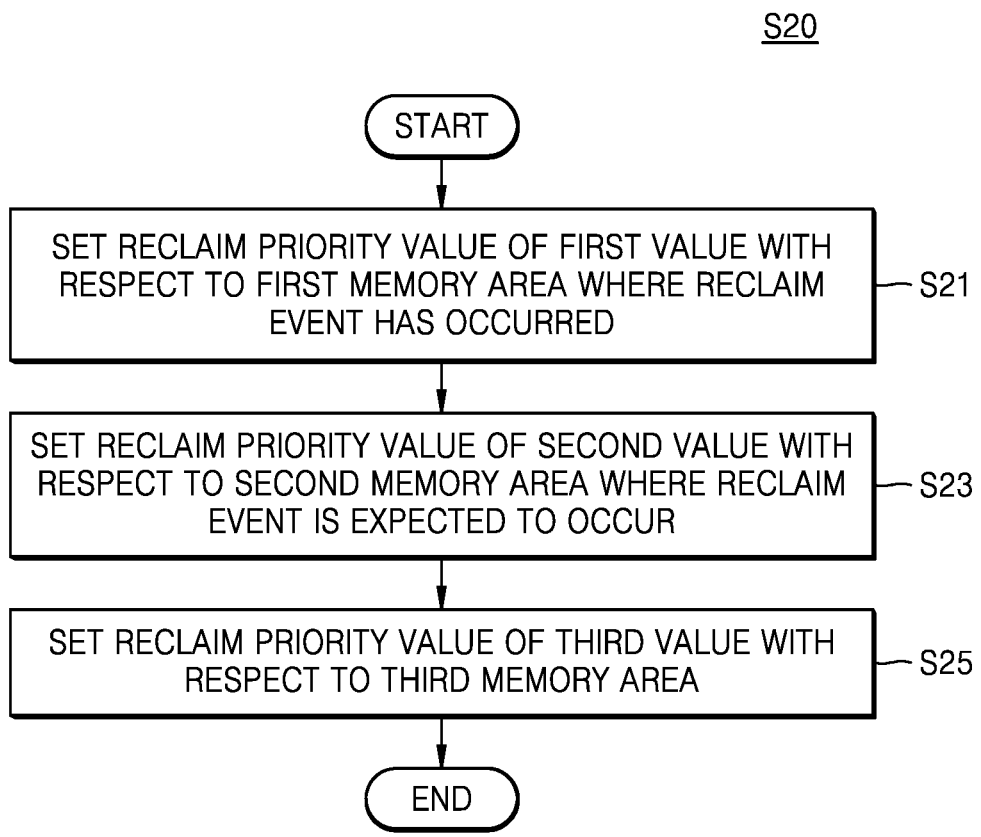
FIG. 8 is a flowchart illustrating an operating method of a storage device according to an embodiment.

FIG. 8 is a flowchart illustrating an operating method of the storage device 100 according to an embodiment, and is an example of operation S20 of FIG. 3. Operation S20 may include operations S21 to S25.

Referring to FIGS. 1 and 8, in operation S21, the storage device 100 may set a reclaim priority value of a first value with respect to a first memory area where a reclaim event has occurred among reclaim operation targets. In an embodiment, the storage device 100 may determine that the reclaim event has occurred in the first memory area when an error bit rate of data read from the first memory area is equal to or greater than a reference value, or specific predetermined defense code is executed for a read retry with respect to the first memory area (to eliminate a data error). The error bit rate may mean a rate of error bits among the read data.

In operation S23, the storage device 100 may set a reclaim priority value of a second value with respect to a second memory area where the reclaim event is expected to occur among the reclaim operation targets. For example, even when the storage device 100 does not determine whether the reclaim event has occurred, the storage device 100 may set the reclaim priority value of the second value when the reclaim event is highly likely to occur. In an embodiment, the second memory area where the reclaim event is expected to occur may be a previously designated memory area, or a memory area with low data reliability due to a physical structure. A description of the memory area where the reclaim event is expected to occur is described later with respect to FIGS. 9A, 9B, 10A, and 10B.

In operation S25, the storage device 100 may set the reclaim priority value of the third value for the third memory area other than the target of the reclaim operation.

After performing operation S20, the storage device 100 may perform the reclaim operation on the first memory area, then the storage device 100 may perform the reclaim operation on the second memory area, and finally the storage device 100 may perform the reclaim operation on a third memory area having the third value. The storage device 100 according to the inventive concept may firstly perform the reclaim operation on the memory area where the reclaim event has occurred, and then perform the reclaim operation on the memory area where the reclaim event is expected to occur, thereby preventing data degradation.

Figure 9A:
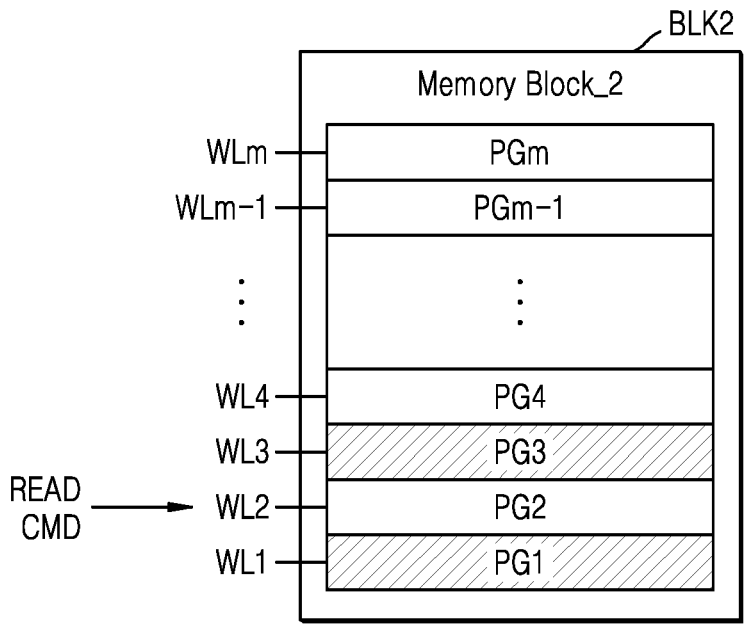
FIGS. 9A and 9B are diagrams illustrating operation S23 of FIG. 8.
Figure 9B:
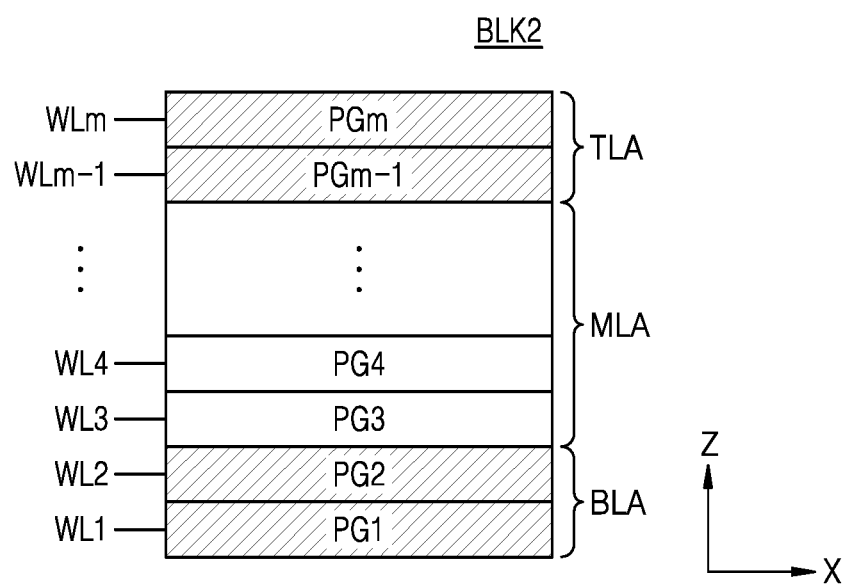

FIGS. 9A and 9B are diagrams illustrating operation S23 of FIG. 8. FIGS. 9A and 9B are diagrams illustrating a method of determining a memory area where a reclaim event is expected to occur among a plurality of pages included in a memory block.

Referring to FIG. 9A, it may be assumed that a read command CMD with respect to the second page PG2 of the memory block BLK2 is issued. At this time, the read command CMD may be issued due to a host read operation, or the read command CMD may be issued due to a background read operation.

A read voltage may be applied to the second word line WL2 connected to the second page PG2 to read the second page PG2. Accordingly, stress may be applied to each of the first word line WL1 and the third word line WL3, which are word lines adjacent to the second word line WL2, and data programmed in the first page PG1 and the third page PG3 respectively connected to the first word line WL1 and the third word line WL3 may be damaged. That is, a read disturb may occur on the first page PG1 and the third page PG3.

Accordingly, the first page PG1 and the third page PG3 connected to word lines adjacent to the second word line WL2 on which the read operation is performed may be separately managed as the memory area where the reclaim event is expected to occur by degradation information stored in the metadata buffer (e.g., MB in FIG. 2). In FIG. 9A, only the first page PG1 and the third page PG3 respectively connected to the first word line WL1 and the third word line WL3 directly adjacent to the second word line WL2 are described but the inventive concept is not limited thereto. The fourth page PG4 connected to the fourth word line WL4 may also be determined as the memory area where the reclaim event is expected to occur.

Referring to FIGS. 5 and 9B, when a memory device is implemented to include a NAND flash memory device having a vertical structure, the first to mth word lines WL1 to WLm may be formed to be sequentially stacked in the Z-axis direction with respect to a substrate. The first to m-th pages PG1 to PGm respectively connected to the first to m-th word lines WL1 to WLm may also be formed to be sequentially stacked with respect to the substrate.

The memory block BLK2 may include a bottom layer area BLA close to the substrate, a middle layer area MLA disposed on the bottom layer area BLA, and a top layer area TLA disposed on the middle layer area MLA. For example, the bottom layer area BLA may include the first page PG1 and the second page PG2, and the top layer area TLA may include the (m−1)th page PG(m−1)th and the mth page PGm, and the middle layer area MLA may include the remaining pages.

The pages included in the bottom layer area BLA, for example, the first page PG1 and the second page PG2, may have a structurally and relatively low data reliability compared to the middle layer area MLA. In addition, the pages included in the top layer area TLA, for example, the (m−1)th page PG(m−1)th and the m page PGm, may have a structurally relatively low data reliability compared to the middle layer area MLA. Accordingly, by the degradation information stored in the metadata buffer (e.g., MB of FIG. 2), the pages included in the bottom layer area BLA may be managed as the memory area where the reclaim event is expected to occur, and the pages included in the top layer area TLA may be managed as the memory area where the reclaim event is expected to occur. In an example embodiment, the degradation information may include page addresses of the pages located in the bottom area BLA or page addresses of the pages located in the top layer area TLA. In an example embodiment, the controller 110 of FIG. 1 may treat the page addresses stored as the degradation information as a reclaim event being expected to occur, and check whether a reclaim event has occurred on the pages corresponding to the page addresses stored as the degradation information.

Figure 10A:
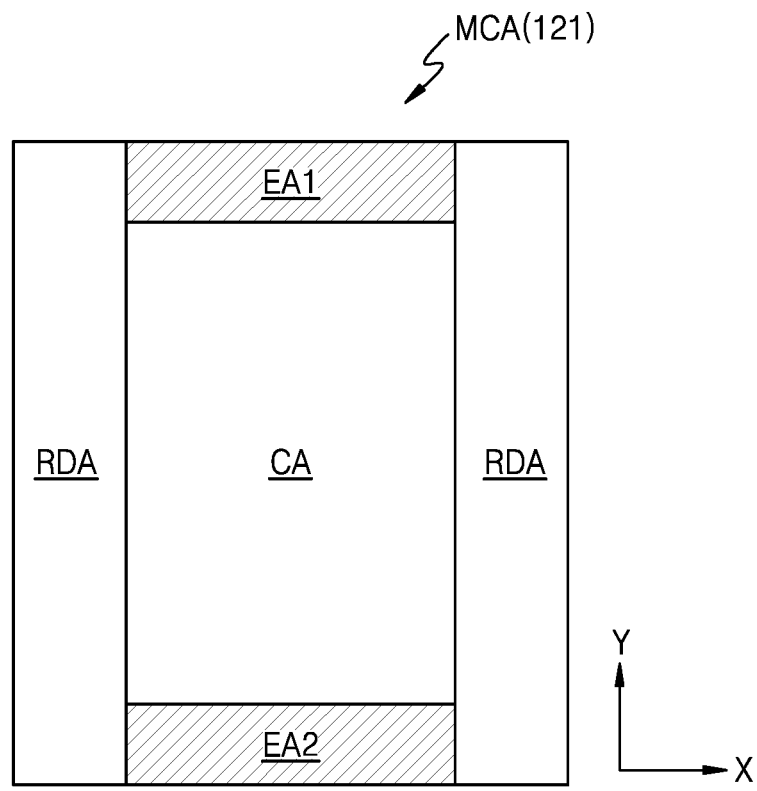
FIGS. 10A and 10B are diagrams illustrating operation S23 of FIG. 8.
Figure 10B:
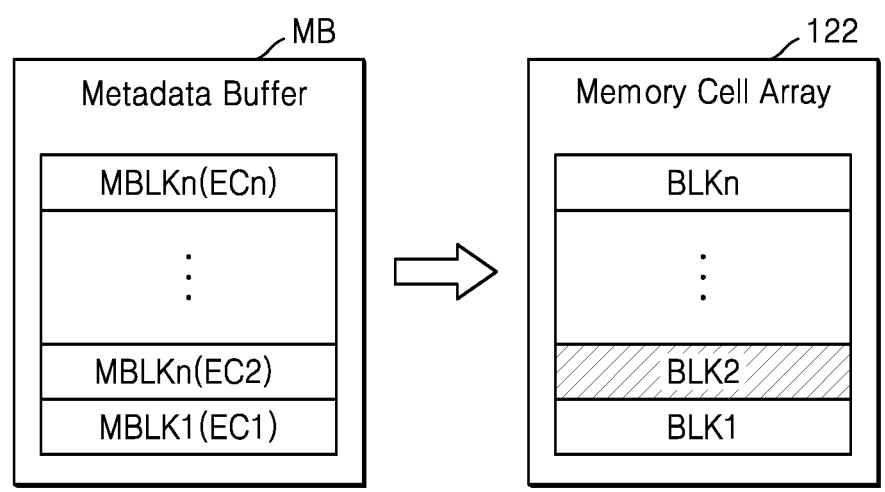

FIGS. 10A and 10B are diagrams illustrating operation S23 of FIG. 8. FIGS. 10A and 10B are diagrams illustrating a method of determining a memory block where a reclaim event is expected to occur among a plurality of memory blocks.

Referring to FIGS. 5 and 10A, a memory cell array area MCA and an address decoder area RDA may be arranged side by side in the X-axis direction. The memory cell array 122 may be disposed in the memory cell array area MCA, and the address decoder 123 may be disposed in the address decoder area RDA.

The memory cell array area MCA may include a center area CA disposed in the center and a first edge area EA1 and a second edge area EA2 disposed in upper and lower sides of the center area CA. A memory block disposed in the first edge area EA1 and the second edge area EA2 may have a structurally and relatively low data reliability compared to a memory block arranged in the center area CA. Therefore, the memory blocks disposed in the first edge area EA1 and the second edge area EA2 may be managed as the memory area where the reclaim event is expected to occur by degradation information stored in the metadata buffer (e.g., MB of FIG. 2). In an example embodiment, the degradation information may include row addresses of the pages located in the first edge area EA1 and the second edge area EA2. In an example embodiment, the controller 110 of FIG. 1 may treat the page addresses stored as the degradation information as a reclaim event being expected to occur, and check whether a reclaim event has occurred on the pages corresponding to the page addresses stored as the degradation information.

Referring to FIG. 10B, degradation information MBLK1 to MBLKn of the plurality of memory blocks BLK1 to BLKn may be stored in the metadata buffer MB. For example, erasure counts EC1 to ECn of the plurality of memory blocks BLK1 to BLKn may be stored in the metadata buffer MB as the degradation information MBLK1 to MBLKn respectively.

As an erasure count increases, a degree of degradation of a corresponding memory block may increase. Memory blocks having an erasure count equal to or greater than a reference value may be separately managed as the memory areas where the reclaim event is expected to occur. The second memory block BLK2 having a high erasure count (e.g., the second erasure count EC2) may be separately managed as the memory area where the reclaim event is expected to occur by the degradation information MBLK1 to MBLKn stored in the metadata buffer MB.

Figure 11:
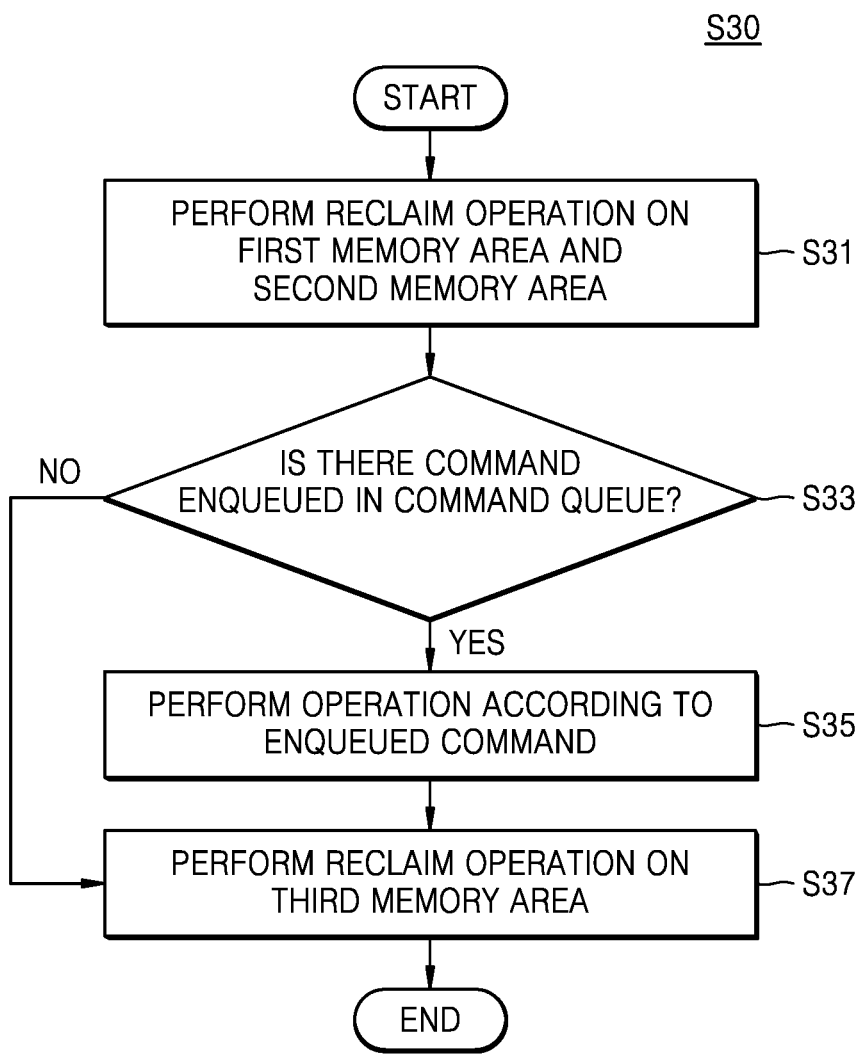
FIG. 11 is a flowchart illustrating an operating method of a storage device according to an embodiment.

FIG. 11 is a flowchart illustrating an operating method of the storage device 100 according to an embodiment, and is an example of operation S30 of FIG. 3. Operation S30 may include operations S31 to S37. In an example embodiment, the operation S30 of FIG. 3 is part of a reclaim operation performed on the source memory area including the first memory area where a reclaim event has occurred.

Referring to FIGS. 1 and 11, in operation S31, the storage device 100 may perform a reclaim operation on a first memory area where a reclaim event has occurred. For example, the storage device 100 may perform the reclaim operation on the first memory area having a reclaim priority value of a first value. In operation S31, the storage device 100 may further perform the reclaim operation on a second memory area (e.g., a memory area having a reclaim priority value of a second value) where the reclaim event is expected to occur.

In operation S33, the storage device 100 may determine whether there is a command enqueued in the command queue (e.g., CQ of FIG. 2). When the request REQ is received from the host 200, a command corresponding to the request REQ may be enqueued in the command queue CQ. If there is no command enqueued in the command queue CQ, in operation S37, the storage device 100 may perform the reclaim operation on another memory area (e.g., a memory area where the reclaim event has not occurred) to complete the reclaim operation on the source memory area.

If there is a command enqueued in the command queue CQ, the storage device 100 may perform an operation according to the enqueued command in operation S35. For example, when a read request is received from the host 200 and thus a read command is enqueued in the command queue CQ, the storage device 100 may perform a read operation before completing the reclaim operation on another memory area of the source memory area (e.g., a memory area where the reclaim event has not occurred). Alternatively, for example, when a write request is received from the host 200 and thus, a write command is enqueued in the command queue CQ, the storage device 100 may perform a write operation before completing the reclaim operation on another memory area of the source memory area (e.g., a memory area where the reclaim event has not occurred).

When the operation according to the request REQ of the host 200 is completed in operation S35, in operation S37, the storage device 100 may perform the reclaim operation on the other memory area, a third memory area where the reclaim event has not occurred (e.g., a memory area having a third value of a reclaim priority value).

The storage device 100 according to the inventive concept may preferentially perform the reclaim operation on the memory area where the reclaim event has occurred, then perform the operation according to the request REQ of the host 200, and after the operation according to the request REQ of the host 200, perform the reclaim operation on the remaining memory area where the reclaim event has not occurred to complete the reclaim operation on the source memory area. The present invention is not limited thereto. In an example embodiment, the storage device 100 may preferentially perform the reclaim operation on the memory area where the reclaim event has occurred and the memory area where the reclaim event is expected to occur, then perform the operation according to the request REQ of the host 200, and after completing the operation according to the request REQ of the host 200, perform the reclaim operation on the remaining memory area where the reclaim event has not occurred to complete the reclaim operation on the source memory area. Therefore, the storage device 100 may prevent data from being degraded by the delay in the reclaim operation of the memory area where the reclaim event has occurred, and simultaneously prevent the processing of the request REQ of the host 200 from being delayed.

In the description of FIG. 11, an embodiment in which a command according to the request REQ of the host 200 is performed after performing the reclaim operation on the first memory area and the second memory area is described, but the storage device 100 according to the inventive concept is not limited thereto. In an embodiment, the storage device 10 may process the command according to the request REQ of the host 200 after performing the reclaim operation on the first memory area where the reclaim event has occurred. Subsequently, the storage device 10 may the reclaim operation on the second memory area where the reclaim event is expected to occur.

Figure 12:
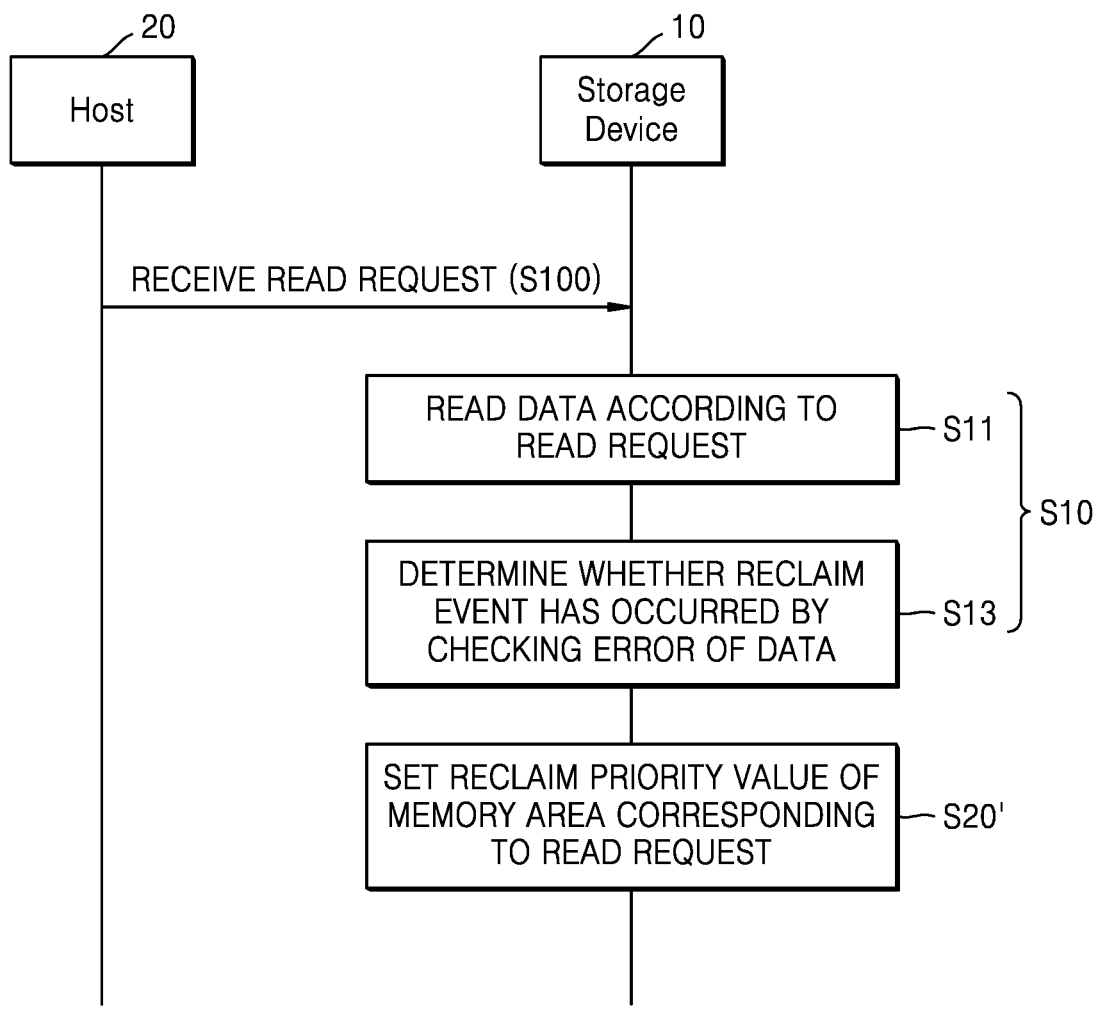
FIG. 12 is a flowchart illustrating an operating method of a storage device according to an embodiment.

FIG. 12 is a flowchart illustrating an operating method of the storage device 100 according to an embodiment, and is an example of operations S10 and S20 of FIG. 3.

Referring to FIG. 12, in operation S100, the host 200 may transmit a read request to the storage device 100.

The operation S10 of FIG. 3 may include operations S11 to S13. In operation S11, the storage device 100 may read data in response to the read request.

In operation S13, the storage device 100 may check an error of the read data to determine whether a reclaim event has occurred. In an embodiment, the storage device 100 may determine that the reclaim event has occurred when an error bit rate of the read data is greater than or equal to a reference value. Alternatively, in an embodiment, the storage device 100 may execute defense code by firmware to perform a read retry due to the error in the read data, and determine that the reclaim event has occurred when executing previously designated specific defense code.

In operation S20', the storage device 100 may set a reclaim priority value of a memory area corresponding to the read request. For example, when it is determined that the reclaim event has occurred in operation S13, the storage device 100 may set a priority value (e.g., a first value) of a prior order such that the reclaim operation is preferentially performed on the memory area associated with the read request. Otherwise, when it is determined that the reclaim event has not occurred, the storage device 100 may set a priority value (e.g., a third value) of a posterior order to the memory area corresponding to the read request.

FIGS. 13 to 16 are flowcharts illustrating an operating method of the storage device 100 according to an embodiment, and are examples of operations S10 and S20 of FIG. 3. FIGS. 13 to 16 are diagrams illustrating an embodiment in which the storage device 100 performs a background read operation. Each of operations described with respect to FIGS. 13 to 16 may be periodically performed. In FIGS. 13 to 16, redundant descriptions of the same reference numerals as in FIG. 12 will be omitted.

Figure 13:
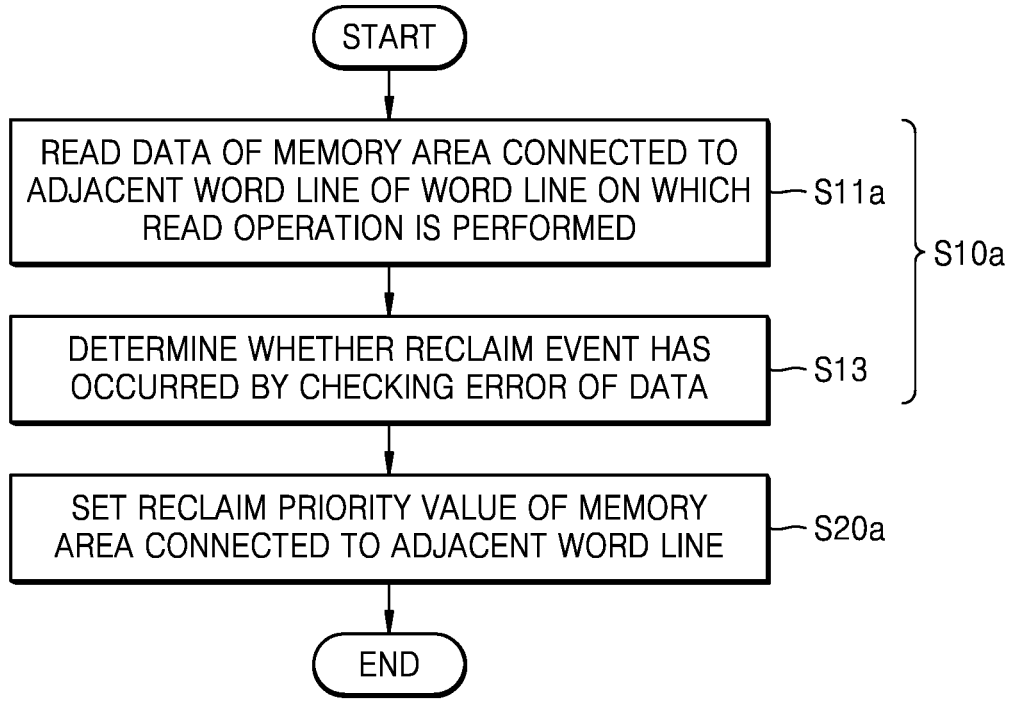
FIGS. 13 to 16 are flowcharts illustrating an operating method of a storage device according to an embodiment.

Referring to FIGS. 1 and 13, operation S10a may include operations S11a and S13. In operation S11a, the storage device 100 may read data in a memory area connected to an adjacent word line of a word line on which the read operation (background read operation) is performed. When the read operation is performed, a read voltage may be applied to a specific word line, and stress may be generated (a read disturb) on word lines adjacent to the specific word line. Accordingly, the storage device 100 may determine whether a reclaim event has occurred by reading the memory area connected to the adjacent word line of the word line on which the read operation is performed. In operation S13, the storage device 100 may check an error in data to determine whether the reclaim event has occurred.

In operation S20a, the storage device 100 may set a reclaim priority value of the memory area connected to the adjacent word line. For example, when it is determined that the reclaim event has occurred in operation S13, the storage device 100 may set a priority value (e.g., a first value) of a prior order such that the reclaim operation is preferentially performed on the memory area connected to the adjacent word line. Otherwise, when it is determined that the reclaim event has not occurred, the storage device 100 may set a priority value (e.g., a third value) of a posterior order to the memory area connected to the adjacent word line.

Figure 14:
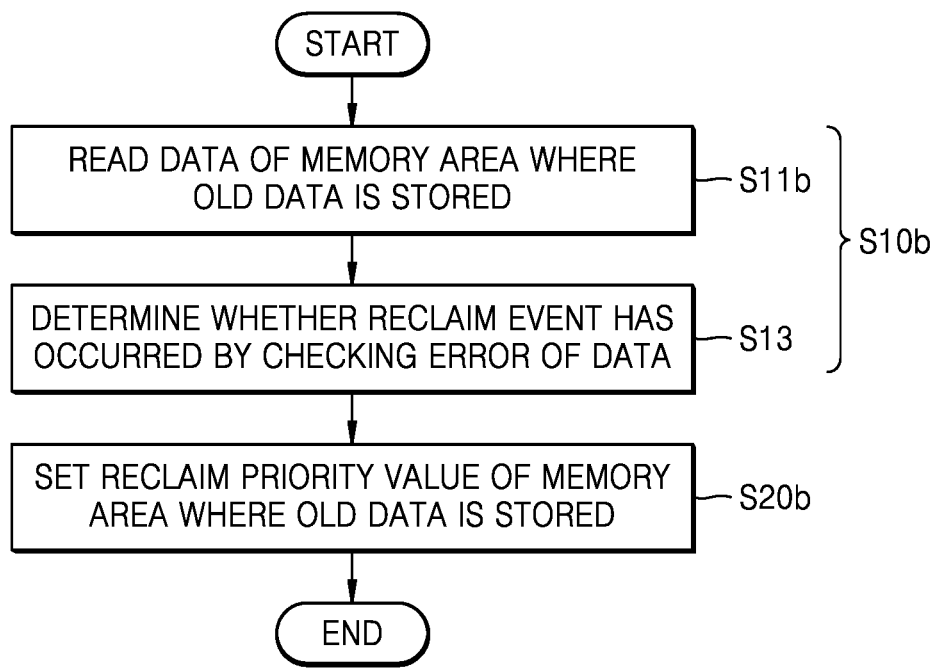

Referring to FIGS. 1 and 14, operation S10b may include operations S11b and S13. In operation S11b, the storage device 100 may read data from a memory area where old data is stored. The data may degrade over time after the data is programmed. Accordingly, the storage device 100 may determine the data as the old data when a reference time or more elapses after the data is programmed, and determine whether the reclaim event has occurred by reading the memory area where the old data is stored. In operation S13, the storage device 100 may check an error in the data to determine whether the reclaim event has occurred.

In operation S20b, the storage device 100 may set a reclaim priority value of the memory area where the old data is stored. For example, when it is determined that the reclaim event has occurred on the memory area where the old data is stored in operation S13, the storage device 100 may set a priority value of a prior order such that the reclaim operation is preferentially performed on the memory area where the old data is stored. Otherwise, when it is determined that the reclaim event has not occurred, the storage device 100 may set a priority value of a posterior order to the memory area where the old data is stored.

Figure 15:
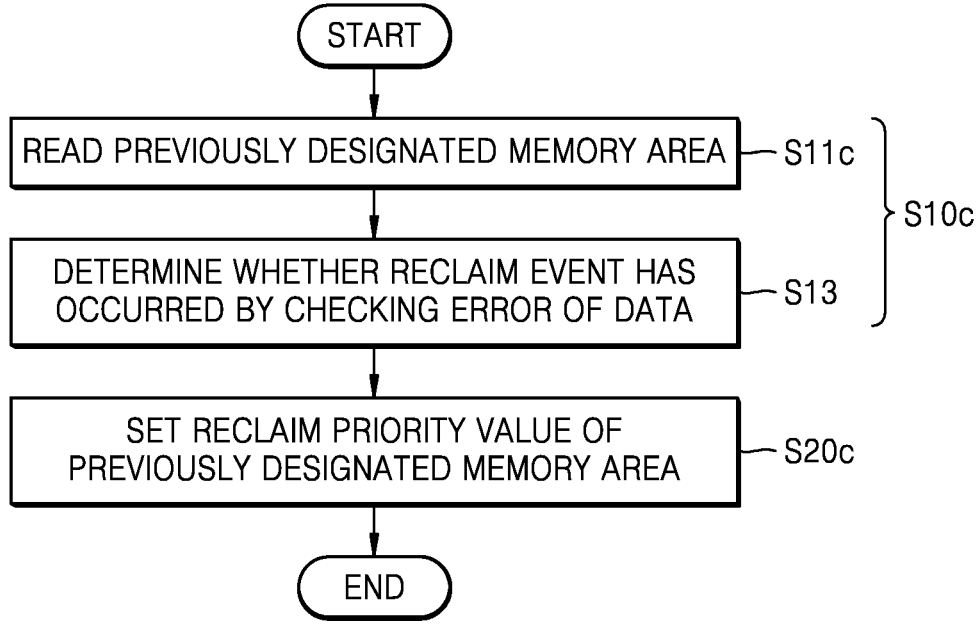

Referring to FIGS. 1 and 15, operation S10c may include operations S11c and S13. In operation S11c, the storage device 100 may read data from a previously designated memory area. The previously designated memory area may be a memory area where data reliability may be low due to a physical structure of the memory cell array (e.g., 122 in FIG. 4) of a nonvolatile memory. Information about the previously designated memory area may be stored as degradation information in the metadata buffer MB.

For example, as described with respect to FIG. 9B, the previously designated memory area may be pages included in the bottom layer area BLA or the top layer area TLA of a memory block. Alternatively, for example, as described with reference to FIG. 10A, the previously designated memory area may be memory blocks disposed in the first edge area EA1 and the second edge area EA2. In operation S13, the storage device 100 may check an error in the data read from the bottom layer area BLA or the top layer area TLA to determine whether the reclaim event has occurred.

In operation S20c, the storage device 100 may set a reclaim priority value of the previously designated memory area. For example, when it is determined that the reclaim event has occurred in operation S13, the storage device 100 may set a priority value of a prior order such that the reclaim operation is preferentially performed on the previously designated memory area. Otherwise, when it is determined that the reclaim event has not occurred, the storage device 100 may set a priority value of a posterior order to the previously designated memory area.

Figure 16:
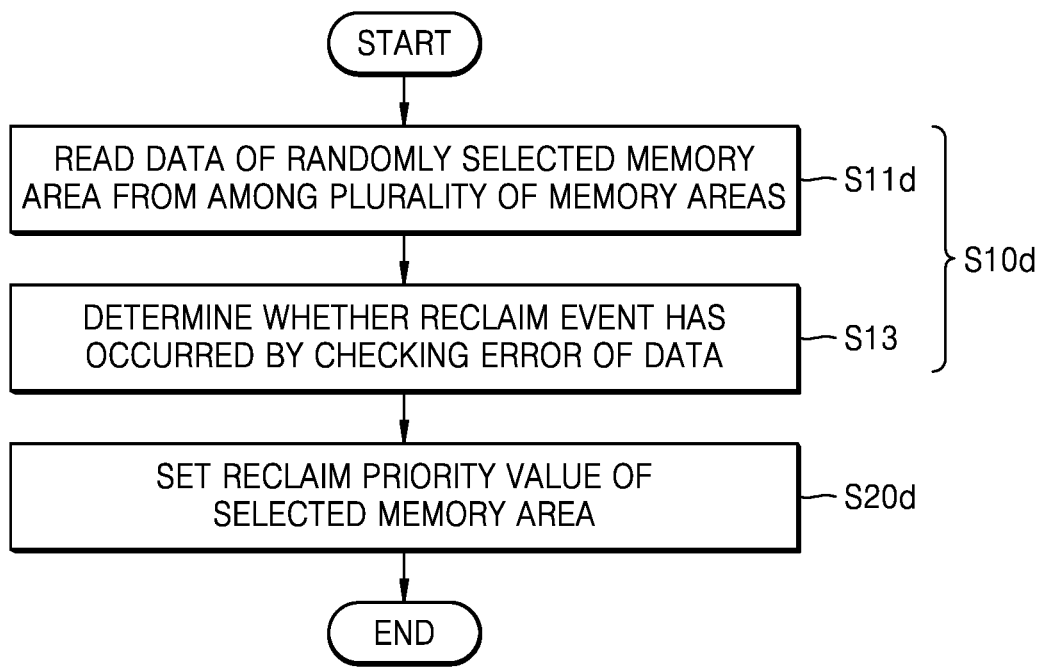

Referring to FIGS. 1 and 16, operation S10d may include operations S11d and S13. In operation S11d, the storage device 100 may randomly select a memory area from among a plurality of memory areas to read data of selected the memory area. For example, the storage device 100 may randomly select the second page PG2 from among the first to mth pages PG1 to PGm of FIG. 4 to read the data. In operation S13, the storage device 100 may check an error in the data to determine whether the reclaim event has occurred.

In operation S20d, the storage device 100 may set a reclaim priority value of the selected memory area. For example, when it is determined that the reclaim event has occurred in operation S13, the storage device 100 may set a priority value of a prior order such that the reclaim operation is preferentially performed on the selected memory area. Otherwise, when it is determined that the reclaim event has not occurred, the storage device 100 may set a priority value of a posterior order to the selected memory area.

Figure 17:
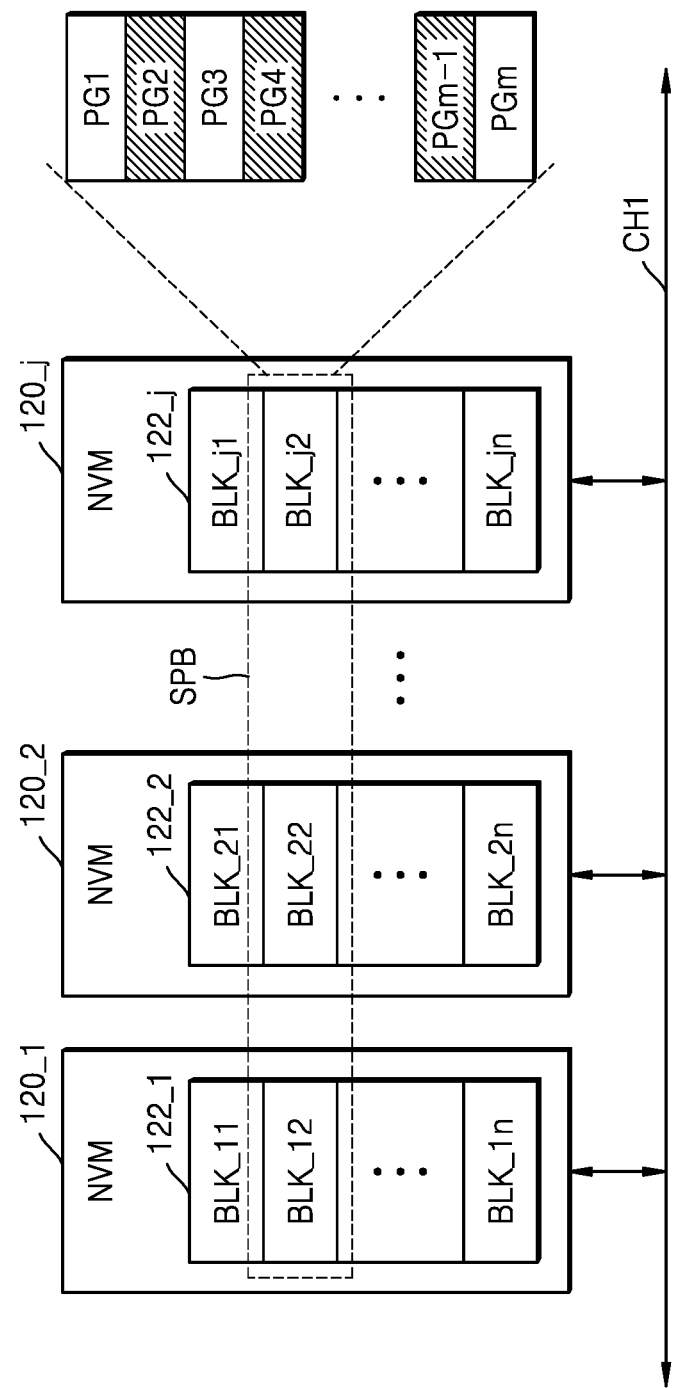
FIG. 17 is a block diagram illustrating grouping of a super block in a nonvolatile memory according to an embodiment.

FIG. 17 is a block diagram illustrating grouping of a super block SPB in the nonvolatile memory 120 of FIG. 1 according to an embodiment.

Referring to FIGS. 1 and 17, the memory devices NVM1 that communicate with the controller 110 through the first channel CH1 may include first to jth memory devices 120_1 to 120_j (j is an integer greater than or equal to 2). The first to jth memory devices 120_1 to 120_j may respectively include the n memory blocks BLK_1*l* to BLK_1*n*, BLK_2*l* to BLK_2*n*, and BLK_j1 to BLK_jn.

In the first to jth memory devices 120_1 to 120_j, blocks allocated with the same address (or blocks disposed in the same location) may be grouped into one super block SPB. For example, the second memory blocks BLK_12, BLK_22, and BLK_j2 of the first to jth memory devices 120_1 to 120_j may be grouped into the one super block SPB.

In an embodiment, the storage device 100 may perform a reclaim operation in units of the super block SPB. For example, when a reclaim event has occurred in the second, fourth, and (m−1)th pages PG2, PG4, and PG(m−1)th included in the second memory block BLK_j2 of the jth memory device 120_j, the second memory blocks BLK_12, BLK_22, and BLK_j2 included in the super block SPB together with the second memory block BLK_j2 of the jth memory device 120_j may be registered in the reclaim queue (e.g., RQ of FIG. 7) as source blocks.

As described with respect to FIGS. 6A and 7, a physical address of a source block and a reclaim priority value corresponding thereto may be stored in the reclaim queue RQ. For example, reclaim priority values respectively corresponding to the second memory blocks BLK_12, BLK_22, and BLK_j2 may be set in the reclaim queue RQ. The controller 110 may perform a reclaim operation based on the reclaim priority value stored in the reclaim queue RQ.

For example, a reclaim priority value (e.g., the first value PV1) of a prior order may be set to the second memory block BLK_j2 of the jth memory device 120_j in which the reclaim event has occurred, and the reclaim operation may be more preferentially performed on the second memory block BLK_j2 than the other memory blocks of the j-th memory device 120_j. Also, for example, a reclaim priority value of the first value PV1 may be set to the second, fourth, and (m−1)th pages PG2, PG4, and PG(m−1)th of the second memory block BLK_j2 of the jth memory device 120_j, and the reclaim operation may be more preferentially performed on the second, fourth, and (m−1)th pages PG2, PG4, and PG(m−1)th than the other pages of the second memory block BLK_j2.

For example, a reclaim priority value (e.g., the third value PV3) of a posterior order may be set to the second memory block BLK_12 of the first memory device 120_1 in which the reclaim event has not occurred, and the first memory device 120_1 may perform the reclaim operation after performing an operation according to the request REQ of the host 200.

While the inventive concept has been particularly shown and described with reference to embodiments thereof, it will be understood that various changes in form and details may be made therein without departing from the spirit and scope of the following claims.

What is claimed is:

1. An operating method of a storage device comprising:
   detecting whether a reclaim event has occurred on a source memory block including a plurality of memory areas, among a plurality of memory blocks, each memory block being a unit of an erase operation;
   setting a reclaim priority value in a reclaim queue associated with each memory area of the plurality of memory areas; and
   performing a reclaim operation on each memory area of the plurality of memory areas according to the reclaim priority value of each memory area of the plurality of memory areas,
   wherein the reclaim operation moves data stored in the source memory block to a destination memory block, and
   wherein the setting of the reclaim priority value comprises:
      setting, in response to detecting of the reclaim event having occurred to a first memory area among the plurality of memory areas, a first reclaim priority value in the reclaim queue associated with the first memory area;

19 setting, in response to detecting of the reclaim event being expected to occur to a second memory area among the plurality of memory areas, a second reclaim priority value in the reclaim queue associated with the second memory area; and setting, in response to detecting of the reclaim event not having occurred to a third memory area and detecting of the reclaim event not being expected to occur to the third memory area, a third reclaim priority value in the reclaim queue associated with the third memory area.

2. The operating method of claim 1, further comprising:
generating a command according to a request of a host,
wherein the performing of the reclaim operation on the source memory block comprises:
performing the reclaim operation on the first memory area before processing the command according to the request of the host; and
performing, after completing of the processing the command, the reclaim operation on the third memory area, which is different from the first memory area, in the source memory block.

3. The operating method of claim 1,
wherein the detecting of whether the reclaim event has occurred on the source memory block comprises:
receiving a read request with respect to a first memory area of the source memory block from a host;
performing a first read operation to read data from the first memory block area according to the read request; and
determining whether the reclaim event has occurred on the first memory area by checking an error of the data read from the first memory area.

4. The operating method of claim 1,
wherein the detecting of whether the reclaim event has occurred on the source memory block comprises:
reading data from a first memory area, wherein the first memory area is connected to an adjacent word line of a word line on which a read operation has been performed; and
determining whether the reclaim event has occurred on the first memory area by checking an error of the data read from the first memory area.

5. The operating method of claim 1,
wherein the detecting of the reclaim event has occurred on the source memory block comprises:
reading data from a first memory area of the source memory block, wherein the first memory area is previously designated as degradation information; and
determining whether the reclaim event has occurred in the first memory area by checking an error of the data read from the first memory area.

6. The operating method of claim 5,
wherein the storage device comprises a plurality of memory cells arranged in a direction perpendicular to a main surface of a substrate,
wherein the first memory area that is previously designated as degradation information corresponds to a memory area of the source memory block, the memory area being formed of memory cells formed in a bottom layer closest to the substrate, and
wherein the degradation information includes address information of the first memory area.

7. The operating method of claim 5,
wherein the storage device comprises a plurality of memory cells arranged in a direction perpendicular to a main surface of a substrate,

20 wherein the first memory area that is previously designated as degradation information corresponds to a memory area of the source memory block, the memory area being formed of memory cells formed in a top layer farthest from the substrate, and
wherein the degradation information includes address information of the first memory area.

8. The operating method of claim 1,
wherein the detecting of whether the reclaim event has occurred on the source memory block comprises:
reading data from a first memory area randomly selected from the plurality of memory areas included in the storage device;
determining whether the reclaim event has occurred in the first memory area of the source memory block by checking an error of the data read from the first memory area; and
detecting whether the reclaim event has occurred on the first memory area of the source memory block.

9. The operating method of claim 1,
wherein the performing of the reclaim operation comprises moving data from a plurality of multi-level cells included in the source memory block, to a plurality of single-level cells included in the destination memory block.

10. A storage device comprising:
a nonvolatile memory device; and
a controller operatively coupled to the nonvolatile memory device and configured to:
detect whether a reclaim event has occurred on a source memory block of the nonvolatile memory device, wherein the source memory block including a plurality of memory areas, among a plurality of memory blocks, each memory block being a unit of an erase operation;
set a reclaim priority value in a reclaim queue associated with each memory area of the plurality of memory areas; and
perform a reclaim operation on each memory area of the plurality of memory areas in the source memory block based on the reclaim priority value of each memory area of the plurality of memory areas,
wherein the controller, in the setting of the reclaim priority value, is configured to:
set, in response to detecting of the reclaim event having occurred to a first memory area among the plurality of memory areas, a first reclaim priority value in the reclaim queue associated with the first memory area;
set, in response to detecting of the reclaim event being expected to occur to a second memory area among the plurality of memory areas, a second reclaim priority value in the reclaim queue associated with the second memory area; and
set, in response to detecting of the reclaim event not having occurred to a third memory area and detecting of the reclaim event not being expected to occur to the third memory area, a third reclaim priority value to the third memory area.

11. The storage device of claim 10,
wherein the controller is configured to:
issue a command to the nonvolatile memory device according to a request of a host operatively coupled to the controller;
perform a reclaim operation on the first memory area before performing the command on the nonvolatile memory device; and process the command after completing the reclaim operation on the first memory area and before performing the reclaim operation on the second memory area.

12. The storage device of claim 10,
wherein the controller is configured to:
perform a first read operation on a first memory area according to a read request received from a host; and
read data from a second memory area adjacent to the first memory area on which the first read operation has been performed; and
determine whether the reclaim event has occurred on the second memory area by checking an error of the data read from the second memory area,
wherein each of the first memory area and the second memory area corresponds to a page of the source memory block.

13. The storage device of claim 10,
wherein the nonvolatile memory device comprises a plurality of memory cells arranged in a direction perpendicular to a main surface of a substrate,
wherein the controller includes a metadata buffer configured to store, as degradation information, row addresses of memory cells formed in a bottom layer closest to the main surface of the substrate, and
wherein the controller is configured to detect whether the reclaim event has occurred on the memory cells of the bottom layer in the source memory block based on the degradation information stored in the metadata buffer.

14. The storage device of claim 10,
wherein the nonvolatile memory device comprises a plurality of memory cells arranged in a direction perpendicular to a main surface of a substrate, and
wherein the controller includes a metadata buffer configured to store, as degradation information, row addresses of memory cells formed in a top layer farthest from the main surface of the substrate, and
wherein the controller is configured to detect whether the reclaim event has occurred on the memory cells of the top layer in the source memory block based on the degradation information stored in the metadata buffer.

15. The storage device of claim 10,
wherein the nonvolatile memory device comprises a memory cell array area where a plurality of memory cells are disposed,
wherein the memory cell array is divided into a center area, a first edge area and a second edge area, the first and second edge areas being disposed in opposite sides of the center area,
wherein the controller includes a metadata buffer configured to store, as degradation information, row addresses of memory cells formed in the first and second edge areas, and
wherein the controller is configured to detect whether the reclaim event has occurred on the first and second edge areas of the source memory block based on the degradation information stored in the metadata buffer.

16. The storage device of claim 10,
wherein the controller includes a metadata buffer configured to store, as degradation information, an erase count of a first memory area, and
wherein the controller is configured to detect whether the reclaim event has occurred on the first memory area of the source memory block based on the degradation information stored in the metadata buffer.

17. The storage device of claim 10,
wherein the nonvolatile memory device comprises a plurality of memory devices configured to communicate with the controller through the same channel,
wherein memory areas of each of the plurality of memory devices with the same address as each other are grouped into a super block, and
wherein the controller is further configured to control a reclaim operation in a unit of the super block.

18. A memory device comprising:
a memory cell array comprising a plurality of memory blocks, each of the plurality of memory blocks comprising a plurality of pages; and
a control logic circuit configured to generate a control signal for performing a reclaim operation in a unit of a memory block,
wherein the control logic circuit is configured to perform the reclaim operation by moving data of each page of a source block among the plurality of memory blocks to a destination block among the plurality of memory blocks according to a reclaim priority value of each page, and
wherein the control logic circuit is configured to perform the reclaim operation on at least two pages that have the same reclaim priority value according to an order of a row address of each of the at least two pages.

* * * * *